United States Patent
Jamali et al.

(10) Patent No.: US 10,142,626 B2
(45) Date of Patent: Nov. 27, 2018

(54) METHOD AND SYSTEM FOR FAST MODE DECISION FOR HIGH EFFICIENCY VIDEO CODING

(71) Applicant: ECOLE DE TECHNOLOGIE SUPERIEURE, Montreal (CA)

(72) Inventors: Mohammadreza Jamali, Montreal (CA); Stephane Coulombe, Brossard (CA); Francois Caron, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 492 days.

(21) Appl. No.: 14/929,260

(22) Filed: Oct. 31, 2015

(65) Prior Publication Data
US 2016/0127725 A1    May 5, 2016

Related U.S. Application Data

(60) Provisional application No. 62/073,675, filed on Oct. 31, 2014.

(51) Int. Cl.
*H04N 19/103* (2014.01)
*H04N 19/147* (2014.01)
(Continued)

(52) U.S. Cl.
CPC ........... *H04N 19/103* (2014.11); *H04N 19/14* (2014.11); *H04N 19/147* (2014.11); *H04N 19/176* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 7,499,492 B1 * | 3/2009 | Ameres | H04N 7/50 341/65 |
| 2007/0071105 A1 * | 3/2007 | Tian | H04N 19/176 375/240.24 |

(Continued)

FOREIGN PATENT DOCUMENTS

CN    104378643 A  *  2/2015

OTHER PUBLICATIONS

"A fast intra mode decision method based onreduction of the number of modes in HEVC standard", Fini et al., 2014 7th International Symposium on Telecommunications (IST), Sep. 9-11, 2014 (Year: 2014).*

(Continued)

*Primary Examiner* — Janese Duley
(74) *Attorney, Agent, or Firm* — IP-MEX Inc.; Victoria Donnelly

(57) ABSTRACT

Methods and systems for encoding video data are provided. Evolving standards for video encoding such as High Efficiency Video Coding (HEVC) standard require a significant increase in computational complexity for both inter and intra encoding. The method includes calculating an approximate cost of each of a first set of prediction modes. Then selecting a second set of prediction modes from the first set of prediction modes based on probability distributions associated with each of the modes in the first set of prediction modes, the second set having substantially fewer prediction modes than the first. A number of candidate prediction modes prior to rate distortion optimization (RDO) is reduced. Experimental results show that the proposed method provides substantial time reduction and negligible quality loss as compared to the HEVC reference.

27 Claims, 13 Drawing Sheets

(51) Int. Cl.
*H04N 19/176* (2014.01)
*H04N 19/14* (2014.01)
*H04N 19/50* (2014.01)

(56) References Cited

U.S. PATENT DOCUMENTS

| | | | |
|---|---|---|---|
| 2011/0164677 A1* | 7/2011 | Lu | H04N 19/176 375/240.02 |
| 2013/0266063 A1 | 10/2013 | Jun | |
| 2014/0219342 A1 | 8/2014 | Yu | |
| 2014/0219349 A1* | 8/2014 | Chien | H04N 19/105 375/240.13 |
| 2015/0010070 A1 | 1/2015 | Yamauchi | |
| 2015/0195519 A1 | 7/2015 | Li | |
| 2015/0195520 A1 | 7/2015 | Li | |

OTHER PUBLICATIONS

Benjamin Bross, Woo-Jin Han, Jens-Rainer Ohm, Gary J. Sullivan, Ye-Kui Wang, Thomas Wiegand, High Efficiency Video Coding (HEVC) text specification draft 10 (for FDIS & Consent), Joint Collaborative on Team Video Coding (JCT-VC) of ITU-T SG 16 WP 3 and ISO/IEC JTC 1/SC 29/WG 11, 12th Meeting: Geneva, CH, Jan. 14-23, 2013, Document: JCTVC-L1003_v14.

Gary J. Sullivan, Jens-Rainer Ohm, Woo-Jin Han and Thomas Wiegand, Overview of the High Efficiency Video Coding (HEVC) Standard, IEEE Transactions on Circuits and Systems for Video Technology, vol. 22, No. 12, Dec. 2012; pp. 1649-1668.

Jani Lainema, Frank Bossen, Woo-Jin Han, Junghye Min and Kemal Ugur, Intra Coding of the HEVC Standard, IEEE Transactions on Circuits and Systems for Video Technology, vol. 22, No. 12, Dec. 2012, pp. 1792-1801.

Yinji Piao, Junghye Min, Jianle Chen, Encoder improvement of unified intra prediction, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-C207, WG11 No. m18245.

Liang Zhao, Li Zhang, Xin Zhao, Siwei Ma, Debin Zhao, Wen Gao, Further Encoder Improvement of intra mode decision, Joint Collaborative Team on Video Coding (JCT-VC) of ITU-T SG16 WP3 and ISO/IEC JTC1/SC29WG11, 4th Meeting: Daegu, KR, Jan. 20-28, 2011, Document: JCTVC-D283.

Gaoxing Chen, Zhenyu Pei, Lie Sun, Zhenyu Liu, Takeshi Ikenaga, Fast Intra Prediction for HEVC based on Pixel Gradient Statistics and Mode Refinement, China SIP 2013, 978-14799-104—Apr. 2013 IEEE, pp. 514-517.

Hao Zhang, Zhan Ma, Fast Intra Mode Decision for High Efficiency Video Coding (HEVC); IEEE Transactions on Circuits and Systems for Video Technology, vol. 24, No. 4, Apr. 2014, pp. 660-668.

Liang Zhao, Xiaopeng Fan, Siwei Ma, Debin Zhao, Fat intra-encoding algorithm for High Efficiency Video Coding, Signal Processing: Image Communication, Jun. 29, 2014, pp. 935-944.

Shunqing Yan, Liang Hong, Weifeng He, Qin Wang, Group-Based Fast Mode Decision Algorithm for Intra Prediction in HEVC, 2012 Eighth International Conference on Signal Image Technology and Internet Based Systems, 978-0-7695--4911—Aug. 2012 IEEE, pp. 225-229.

Frank Bossen, Common test conditions and software reference configurations, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, Document: JCTVC-I1100, WG11 No. m25274.

Gisle Bjonegaard, Calculation of average PSNR differences between RD-curves, ITU—Telecommunications Standardization Sector,Study Group 16 Question 6, Video Coding Experts Group (VCEG), Thirteenth Meeting: Austin, Texas, USA, Apr. 2-4, 2001, Document VCEG-M33, Filename: VCEG-M33.doc, Generated: Mar. 29, 2001.

Younhee Kim, Dongsan Jun, Soon-Heung Jung Jin Soo Choi, Jinwong Kim, A Fast Intra-Prediction Method in HEVC Using Rate-Distortion Estimation Based on Hadamard Transform, ETRI Journal, vol. 35, No. 2, Apr. 2013, pp. 270-280.

H Brahmasury Jain, K.R. Rao, Fast Intra Mode Decision in High Efficiency Video Coding, Polibits (50) Jul.-Dec. 2014 ISSN 1870-9044; pp. 5-12.

Hao Zhang, Zhan Ma, Early Termination Schemes for Fast Intra Mode Decision in High Efficiency Video Coding, Research Gate, Conference Paper—May 2013, DOI: 10.1109/ISCAS.2013. 6571778.

Wei Jiang, Hanjie Ma. Yaowu Chen, Gradient Based Fast Mode Decision Algorithm for Intra Prediction in HEVC, 978-1-4577-1415—Mar. 2012 IEEE, pp. 1836-1840.

Liang Zhao, Xiaopeng Fan, Siwei Ma, Debin Zhao, Fast intra-encoding algorithm for High Efficiency Video Coding, Signal Processing: Image Communication, Jun. 29, 2014, pp. 935-944.

* cited by examiner

METHOD AND SYSTEM FOR FAST MODE DECISION FOR HIGH EFFICIENCY VIDEO CODING

CROSS REFERENCES TO RELATED APPLICATIONS

This application claims the benefit of Applicants' prior provisional application, No. 62/073,675, filed on Oct. 21, 2014, the contents of which is hereby incorporated herein for all purposes.

FIELD OF INVENTION

The present invention relates to High Efficiency Video Coding (HEVC), and in particular to fast mode decision for HEVC based on edge detection and cost classification, including sum of absolute transformed differences (SATD) cost classification.

BACKGROUND

The new video coding standard, H.265/HEVC, as described in B. Bross, W. J. Han, J. R. Ohm, G. J. Sullivan, Y. K. Wang and T. Wiegand, "High Efficiency Video Coding (HEVC) Text Specification Draft 10", document JCTVC-L1003, ITU-T/ISO/IEC Joint Collaborative Team on Video Coding (JCT-VC), January 20 and G. J. Sullivan, J. R. Ohm, W. J. Han and T. Wiegand, "Overview of the High Efficiency Video Coding (HEVC) Standard", IEEE Transactions on Circuits and Systems for Video Technology, Vol. 22, No. 12, December 2012, herein after Sullivan, can reduce the bit rate by half relative to H.264/AVC for the same visual quality. HEVC, like previous video coding standards, is a hybrid video coding scheme that uses improved features in all encoding modules to enhance the coding efficiency. In intra coding, compared to H.264's 9 modes, HEVC employs 33 directional modes for angular prediction in addition to DC and planar modes as described in J. Lainema, F. Bossen, W. J. Han, J. Min and K. Ugur, "Intra Coding of the HEVC Standard", IEEE Transactions on Circuits and Systems for Video Technology, Vol. 22, No. 12, December 2012, herein after Lainema. This number of modes is now adequate to more precisely predict the directional patterns in high-resolution videos when large block sizes are used. However, this, in addition to the transform tree optimization, has rendered the HEVC intra coding operation much more complex, as compared to previous video codecs.

In mode decision, many computations are needed to select the best intra mode by performing a highly demanding rate distortion optimization (RDO) process. To address this problem, during the development of the standard and after its finalization, several research studies have proposed various approaches for fast intra mode decision.

In Piao et al., Y. Piao, J. H. Min and J. Chen, "Encoder Improvement of Unified Intraprediction", JCTVC-C207, Guangzhou, China, October 2010, authors have proposed rough mode decision (RMD) as a step prior to RDO to exclude the majority of modes from the highly expensive RDO. Their approach reduces the encoding time by about 50%, and has been used in a HEVC reference implementation since its early versions.

Zhao et al., L. Zhao, L. Zhang, X. Zhao, W. Ma, D. Zhao and W. Gao, "Further Encoder Improvement of Intra Mode Decision", JCTVC-D283, Daegu, Korea, January 2011, herein after Zhao, has further reduced the number of candidates by introducing the concept of most probable modes (MPM). They achieved time savings of up to 28% using HM 0.9 with almost equivalent rate-distortion performance. The HEVC reference implementation HM (Test Model) 4.0 and the versions following it include Zhao's approach.

In Jiang et al., W. Jiang, H. Ma, Y. Chen, "Gradient Based Fast Mode Decision Algorithm for Intra Prediction in HEVC", CECNet, April 2012, has proposed a fast mode decision approach based on the gradient information of pixels and obtained another 20% time reduction in comparison with HM 4.0.

Chen et al., G. Chen, Z. Pei, L. Sun, Z. Liu and T. Ikenaga, "Fast Intra Prediction for HEVC based on Pixel Gradient Statistics and Mode Refinement", ChinaSIP, Beijing, July 2013, herein after Chen, has improved the gradient method by introducing a mode decision approach based on pixel gradient statistics and mode refinement. They applied this to HM 8.0 and achieved a 28% time reduction.

Recently, Zhang et al., H. Zhang and Z. Ma, "Fast Intra Mode Decision for High Efficiency Video Coding (HEVC)", IEEE Transactions on Circuits and Systems for Video Technology, Vol. 24, No. 4, April 2014, has proposed a method for fast intra coding and achieved significant time reduction by using the Hadamard cost-based progressive rough mode search and early coding unit split termination.

The same is applicable for by Zhao et al., L. Zhao, X. Fan, S. Ma, D. Zhao, "Fast Intra Encoding Algorithm for High Efficiency Video Coding", Signal Processing: Image Communication 29, June 2014, pages 935-944, who has proposed to reduce time consumption by excluding some coding unit and transform unit depths.

Thus, existing improvements on coding performance in HEVC video codec have been achieved at the expense of higher computation complexity in both inter and intra coding.

Therefore, it would be beneficial to provide a method and system for HEVC intra coding operation that would be less complex and more time efficient.

SUMMARY

Embodiments of the present invention contribute to reductions of time complexity in intra coding while maintaining visual quality of video coding.

Intra-coding is done in 2 phases. First a 'candidate list' of most promising candidates (among numerous candidates) is identified. This step is called 'rough mode decision' and uses SATD (Sum of Absolute Transformed Differences), which is a low-complexity approximation of the cost used in rate distortion optimization (RDO), to provide a 'short list' of candidates. Alternatively, sum of square error (SSE), sum of absolute difference (SAD) may be used. Then the remaining candidates in the short list are individually evaluated using RDO to select the best one.

The present invention is concerned with making this short list even shorter than usual and providing better candidates.

Firstly, there is provided an enhanced gradient-based edge detector. For any detected edge, weights are assigned to three adjacent modes to improve the accuracy of the method compared to previous approaches.

Then, the most relevant modes are used to improve conventional schemes which employ neighboring blocks for intra mode decision.

Then a binary classification is performed, for example, based on the SATD costs, and less promising candidates are eliminated. This step contributes to significantly reduce the number of candidates subject to the complex RDO process, and thus provides considerable time reduction.

Finally, to achieve further time savings, the RDO process is bypassed completely when the mode with the lowest SATD meets certain specific conditions.

In summary, embodiments of the invention bring the following improvements to increase encoding speed while maintaining visual quality.

Classify the candidates into two classes; the ones with lower SATD costs and the ones with higher SATD costs based on the presence of a dominant gap. Only the candidates belonging to the first class will be considered for RDO.

Bypass RDO if the mode with the least cost in the candidate list is the same as a relevant mode of a neighboring block.

Giving weights to neighboring modes based on relative position of the edge compared to main mode.

Adding relevant modes of neighboring blocks in the candidate list.

Thus, the encoding speed is increased and computational complexity is decreased, while maintaining visual quality in video coding.

As one approach based on the method, a first set of intra prediction modes is selected considered and an approximated cost of each of these modes is calculated. Then a second set of intra prediction modes is created. This set includes an intra prediction mode in the first set of intra prediction modes having a minimum approximate cost compared to other intra prediction modes in the first set of intra prediction modes. For each of other intra prediction modes in the first set of intra prediction modes the probability $P((W_i=X-Y_i)<0)$ is calculated where X is a probability distribution associated with the intra prediction mode having the minimum approximate cost and $Y_i$ is a probability distribution associated with one of the other intra prediction modes in the first set of intra prediction modes. If this probability P is less than a confidence level, the one of the other intra prediction modes in the first set of intra prediction modes is added to the second set of intra prediction modes. Then an RDO (Rate Distortion Optimization) cost for each intra prediction mode in the second set of intra prediction modes is calculated and an intra prediction mode from the second set of intra prediction modes having a minimum RDO cost compared to other intra prediction modes in the second set of intra prediction modes is selected.

According to one aspect of the invention there is provided a method of encoding video data, the method including:
 (i) selecting a first set of prediction modes;
 (ii) calculating an approximated cost of each of the first set of prediction modes;
 (iii) creating a second set of prediction modes including a prediction mode in the first set of prediction modes having a minimum approximate cost compared to other prediction modes in the first set of prediction modes;
 (iv) for each of other prediction modes in the first set of prediction modes:
  adding the one of the other prediction modes in the first set of prediction modes to the second set of prediction modes provided that it is not probable enough that, based on its approximate cost value, it will have a higher RDO (Rate Distortion Optimization) cost than a mode having a minimum approximate cost;
 (v) calculating an RDO cost for each prediction mode in the second set of prediction modes; and
 (vi) selecting a prediction mode from the second set of prediction modes having a minimum RDO cost compared to other prediction modes in the second set of prediction modes.

In some embodiments of the method the step (iv) includes:
 (a) calculating a probability P that one of the other prediction modes in the first set of prediction modes has higher RDO cost than the mode having a minimum approximate cost; and
 (b) provided that P is less than a confidence level, adding the one of the other prediction modes in the first set of prediction modes to the second set of prediction modes.

In some embodiments of the method the step (i) includes selecting a DC (Direct Current) prediction mode.

In some embodiments of the method the step (i) includes selecting a planar prediction mode.

In some embodiments of the method the step (i) includes selecting MRM (Most Relevant Modes) prediction modes from neighboring blocks.

In some embodiments of the method the step (ii) includes calculating the approximate costs using a SATD (Sum of Absolute Transformed Differences) algorithm.

In some embodiments of the method the step (ii) includes calculating the approximate costs using a SSE (Sum of Square Error) algorithm.

In some embodiments of the method the step (ii) includes calculating the approximate costs using a SAD (Sum of Absolute Difference) algorithm.

In some embodiments of the method the step 2(a) includes calculating a probability $P((W_i=X-Y_i)<0)$ where X is a normal probability distribution having a mean of $\mu_x$ and a variance of $\sigma^2_x$, $Y_i$ is a normal probability distribution having a mean of $\mu_y$ and a variance of $\sigma^2_y$ and $W_i$ is a normal probability distribution having a mean of $\mu_x-\mu_y$ and a variance of $\sigma^2_x+\sigma^2_y$.

In some embodiments of the method a type of the prediction modes is chosen to be intra prediction mode.

In some embodiments of the method a type of the prediction modes is chosen to be inter prediction mode.

In some embodiments of the method the step (a) includes calculating a probability $P((W_i=X-Y_i)<0)$ where X is a Rician probability distribution, $Y_i$ is a Rician probability distribution and $W_i$ is a Rician probability distribution.

In some embodiments of the method the step (a) includes calculating a probability $P((W_i=X-Y_i)<0)$ where X is a t-location scale probability distribution, $Y_i$ is a t-location scale probability distribution and $W_i$ is a t-location scale probability distribution.

In some embodiments of the method the step (a) includes calculating a probability $P((W_i=X-Y_i)<0)$ where X is a generalized extreme value probability distribution, $Y_i$ is a generalized extreme value probability distribution and W is a generalized extreme value probability distribution.

In some embodiments of the method a value of the confidence level is preferably chosen to be in a range of about 0.6-0.7, and less preferably in a rage of about 0.5-0.8 and yet less preferably a range of about 0.2-0.9.

According to another aspect of the invention there is provided a system for encoding video data, the system comprising:
 a computer-readable storage medium having instructions stored thereon that, when executed, cause a processor to:
  (i) select a first set of prediction modes;
  (ii) calculate an approximated cost of each of the first set of prediction modes;
  (iii) create a second set of prediction modes including a prediction mode in the first set of prediction modes having a minimum approximate cost compared to other prediction modes in the first set of prediction modes;

(iv) for each of other prediction modes in the first set of prediction modes:

add the one of the other prediction modes in the first set of prediction modes to the second set of prediction modes provided that it is not probable enough that, based on its approximate cost value, it will have a higher RDO (Rate Distortion Optimization) cost than a mode having a minimum approximate cost;

(v) calculate an RDO cost for each prediction mode in the second set of prediction modes; and (vi) select a prediction mode from the second set of prediction modes having a minimum RDO cost compared to other prediction modes in the second set of prediction modes.

In some embodiments of the system the instructions cause the processor to:

(a) calculate a probability P that one of the other prediction modes in the first set of prediction modes has higher RDO cost than the mode having a minimum approximate cost; and (b) provided that P is less than a confidence level, add the one of the other prediction modes in the first set of prediction modes to the second set of prediction modes.

In some embodiments of the system the instructions cause the processor to select a DC prediction mode.

In some embodiments of the system the instructions cause the processor to select a planar prediction mode.

In some embodiments of the system the instructions cause the processor to select MRM (Most Relevant Modes) prediction modes from neighboring blocks.

In some embodiments of the system the instructions cause the processor to calculate the approximate costs using a SATD (Sum of Absolute Transformed Differences) algorithm.

In some embodiments of the system the instructions cause the processor to calculate the approximate costs using a SSE (Sum of Square Error) algorithm.

In some embodiments of the system the instructions cause the processor to calculate the approximate costs using a SAD (Sum of Absolute Difference) algorithm.

In some embodiments of the system the instructions cause the processor to calculate a probability $P((W_i=X-Y_i)<0)$ where X is a normal probability distribution having a mean of $\mu_x$ and a variance of $\sigma^2_x$, $Y_i$ is a normal probability distribution having a mean of $\mu_y$ and a variance of $\sigma^2_y$, and $W_i$ is a normal probability distribution having a mean of $\mu_x-\mu_y$ and a variance of $\sigma^2_x+\sigma^2_y$.

In some embodiments of the system the instructions cause the processor to calculate a probability $P((W_i=X-Y_i)<0)$ where X is a Rician probability distribution, $Y_i$ is a Rician probability distribution and $W_i$ is a Rician probability distribution.

In some embodiments of the system the instructions cause the processor to calculate a probability $P((W_i=X-Y_i)<0)$ where X is a t-location scale probability distribution, $Y_i$ is a t-location scale probability distribution and $W_i$ is a t-location scale probability distribution.

In some embodiments of the system the instructions cause the processor to calculate a probability $P((W_i=X-Y_i)<0)$ where X is a generalized extreme value probability distribution, $Y_i$ is a generalized extreme value probability distribution and $W_i$ is a generalized extreme value probability distribution.

In some embodiments of the system a value of the confidence level is preferably chosen to be in a range of about 0.6-0.7, and less preferably in a range of about 0.5-0.8 and yet less preferably a range of about 0.2-0.9.

In some embodiments of the system a type of the prediction modes is chosen to be intra prediction mode.

In some embodiments of the system a type of the prediction modes is chosen to be inter prediction mode.

BRIEF DESCRIPTION OF THE DRAWINGS

Various embodiments of the invention are disclosed in the following detailed description and accompanying drawings.

DETAILED DESCRIPTION OF PREFERRED EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims. It should be noted that although most of the embodiments are related to intra frames, it is understood that methods and systems of the invention are also applicable to inter frames.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

It should be noted at the onset that streams of video data and data output from the systems and methods for encoding the streams of video data described below are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

This patent application is organized as follows. Section 1 is an overview of a system for encoding and decoding video. Section 2 provides an overview of the intra coding process in the HEVC standard, including the block partitioning structure, intra prediction, and mode decision. Section 3 presents the proposed method for fast intra coding. Experimental results are shown in section 4, and section 5 concludes the patent application.

1. OVERVIEW

Figure 1:
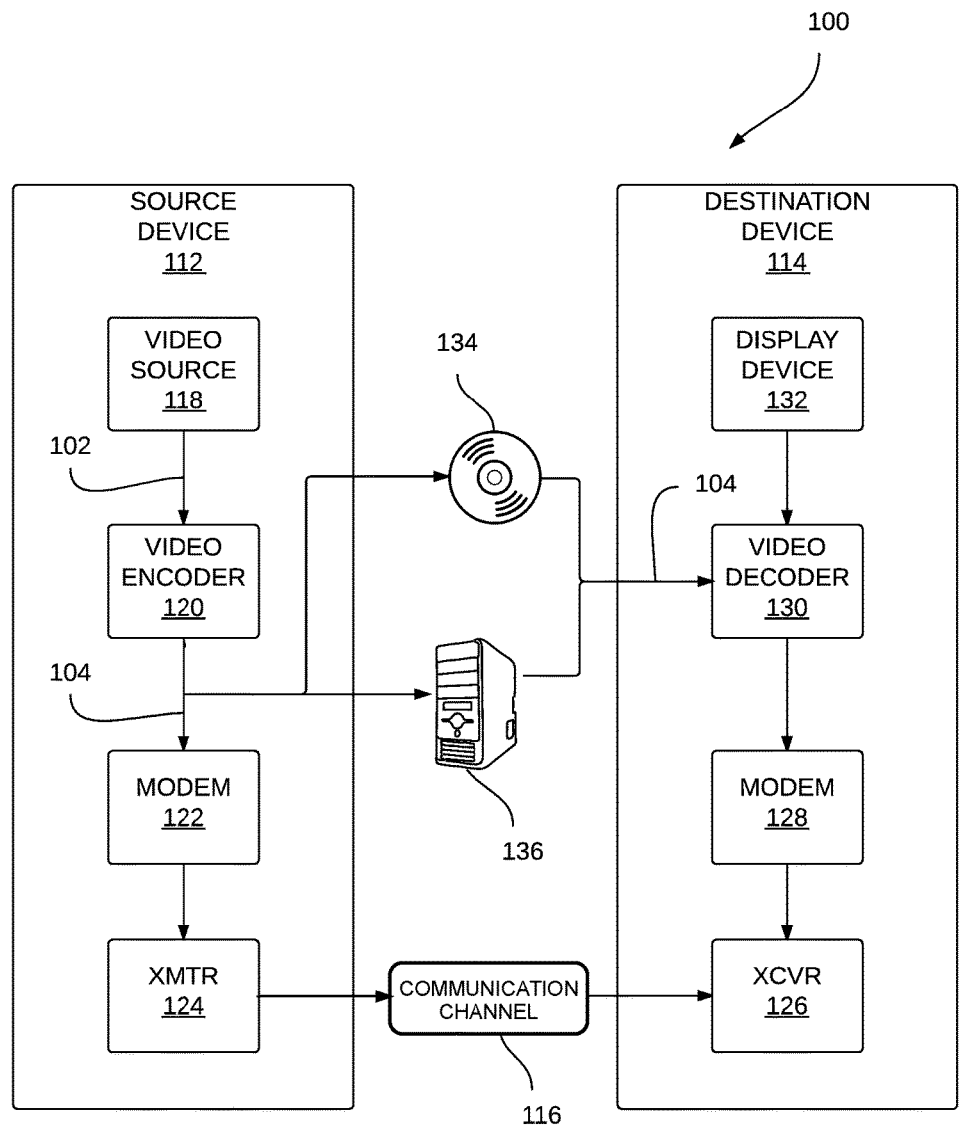
FIG. 1 is a block diagram illustrating a non-limiting example of video encoding and decoding system in accordance with embodiments of the present invention.

FIG. 1 is a block diagram illustrating an example video encoding and decoding system 100 that may be configured to utilize the techniques described in this disclosure to reduce the complexity of mode selection when selecting from multiple, different prediction modes. As shown in the example of FIG. 1, system 100 includes a source device 112 that generates encoded video for decoding by destination device 114. The source device 112 may transmit the encoded video to a destination device 114 via a communication channel 116 or may store the encoded video on a storage medium 134 or a file server 136, such that the encoded video may be accessed by the destination device 114 as desired. The source device 112 and the destination device 114 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, the communication channel 116 may comprise a wireless channel. Alternatively, the communication channel 116 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 116 may form part of a packet-based network, such as a local area network (LAN), a wide-area network (WAN), or a global network such as the Internet. The communication channel 116, therefore, generally represents any suitable communication medium, or collection of different communication media, for transmitting video data from the source device 112 to the destination device 114, including any suitable combination of wired or wireless media. The communication channel 116 may include routers, switches, base stations, or any other equipment that may be useful to facilitate communication from the source device 112 to the destination device 114.

As further shown in the example of FIG. 1, source device 112 includes a video source 118, video encoder 120, a modulator/demodulator 122 ("modem 122") and a transmitter 124. In source device 112, a video source 118 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if the video source 118 is a video camera, the source device 112 and the destination device 114 may form so-called camera phones or video phones. The techniques described in this disclosure, however, are not limited to wireless applications or settings, and may be applied to non-wireless devices including video encoding and/or decoding capabilities. The source device 112 and the destination device 114 are, therefore, merely examples of coding devices that can support the techniques described herein.

The video encoder 120 may encode the captured, pre-captured, or computer-generated video 102. Once encoded, the video encoder 120 may output this encoded video 104 to the modem 122. The modem 122 may then modulate the encoded video 104 according to a communication standard, such as a wireless communication protocol, whereupon a transmitter 124 may transmit the modulated encoded video data to destination device 114. The modem 122 may include various mixers, filters, amplifiers or other components designed for signal modulation. The transmitter 124 may include circuits designed for transmitting data, including amplifiers, filters, and one or more antennas.

The captured, pre-captured, or computer-generated video 102 that is encoded by the video encoder 120 may also be stored onto a storage medium 134 or a file server 136 for later retrieval, decoding and consumption. The storage medium 134 may include Blu-ray discs, DVDs, CD-ROMs, flash memory, or any other suitable digital storage media for storing encoded video 104. The destination device 114 may access the encoded video 104 stored on the storage medium 134 or the file server 136, decode this encoded video 104 to generate decoded video and playback this decoded video.

The file server 136 may be any type of server capable of storing encoded video and transmitting that encoded video 104 to the destination device 114. Example file servers include a web server (e.g., for a website), an FTP server, network attached storage (NAS) devices, a local disk drive, or any other type of device capable of storing encoded video 104 and transmitting it to a destination device. The transmission of encoded video 104 from file server 136 may be a streaming transmission, a download transmission, or a combination of both. The destination device 114 may access the file server 136 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video 104 stored on a file server.

The destination device 114, in the example of FIG. 1, includes a receiver 126, a modem 128, a video decoder 130, and a display device 132. The receiver 126 of the destination device 114 receives information over the channel 116, and the modem 128 demodulates the information to produce a demodulated bitstream for the video decoder 130. The information communicated over the channel 116 may include a variety of syntax information generated by the video encoder 120 for use by the video decoder 130 in decoding the associated encoded video 104. Such syntax may also be included with the encoded video 104 stored on the storage medium 134 or the file server 136. Each of the video encoder 120 and the video decoder 130 may form part of a respective encoder-decoder (CODEC) that is capable of encoding or decoding video data.

The display device 132 of the destination device 114 represents any type of display capable of presenting video data for consumption by a viewer. Although shown as integrated with the destination device 114, the display device 132 may be integrated with, or external to, the destination device 114. In some examples, the destination device 114 may include an integrated display device and also be configured to interface with an external display device. In other examples, the destination device 114 may be a display device. In general, the display device 132 displays the decoded video data to a user, and may comprise any of a variety of display devices such as a liquid crystal display (LCD), a plasma display, an organic light emitting diode (OLED) display, or another type of display device.

The video encoder 120 and the video decoder 130 preferably operate according to a video compression standard, such as the High Efficiency Video Coding (HEVC) standard. The techniques of this disclosure, however, are not limited to any particular coding standard.

Although not shown in FIG. 1, in some aspects, the video encoder 120 and the video decoder 130 may each be integrated with an audio encoder and decoder, and may include appropriate MUX-DEMUX units, or other hardware and software, to handle encoding of both audio and video in a common data stream or separate data streams.

The video encoder 120 and the video decoder 130 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 120 and the video decoder 130 may be included in one or more encoders or decoders, either of which may be integrated as part of a combined encoder/decoder (CODEC) in a respective device.

Figure 2:
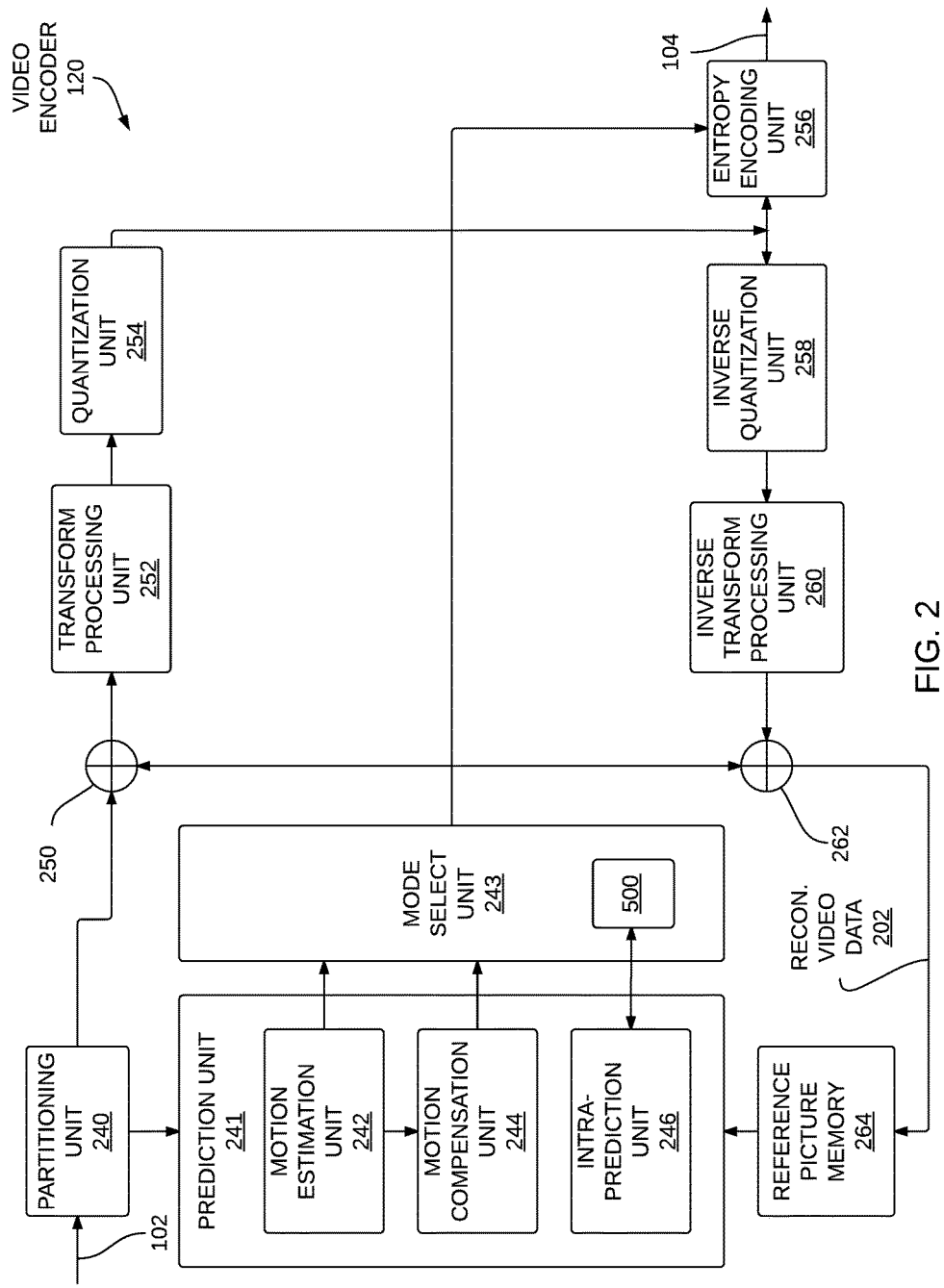
FIG. 2 is a block diagram illustrating a non-limiting example of a video encoder shown in FIG. 1.

FIG. 2 is a block diagram illustrating an example of the video encoder 120 that may implement techniques to reduce the complexity of mode selection when selecting from multiple, different prediction modes. The video encoder 120 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, the video encoder 120 includes a partitioning unit 240, a prediction unit 241, a reference picture memory 264, a summer 250, a transform processing unit 252, a quantization unit 254, and an entropy encoding unit 256. The prediction unit 241 includes a motion estimation unit 242, a motion compensation unit 244, and an intra prediction unit 246. For video block reconstruction, the video encoder 120 also includes an inverse quantization unit 258, an inverse transform processing unit 260, and a summer 262. A deblocking filter (not shown in FIG. 2) may also be included to filter block boundaries to remove blockiness artifacts from reconstructed video 202. If desired, the deblocking filter would typically filter the output of summer 262. Additional loop filters (in loop or post loop) may also be used in addition to the deblocking filter. The video encoder 120 also includes a mode select unit 243. The mode select unit 243 may select one of the coding modes, intra or inter, e.g., based on error results. As further described in FIG. 2, the mode select unit 243 may implement techniques for reducing the space required to store rate distortion values when selecting from multiple, different prediction modes.

As shown in FIG. 2, video encoder 120 receives video 102, and partitioning unit 240 partitions the video 102 into video blocks. This partitioning may also include partitioning into slices, tiles, or other larger units, as wells as video block partitioning, e.g., according to a quadtree structure of LCUs and CUs. The video encoder 120 generally illustrates the components that encode video blocks within a video slice to be encoded. In general, a slice may be divided into multiple video blocks (and possibly into sets of video blocks referred to as tiles).

A mode select unit 243 may select one of a plurality of possible coding modes, such as one of a plurality of intra coding modes or one of a plurality of inter coding modes, for the current video block based on error results (e.g., coding rate and the level of distortion). A prediction unit 241 may provide the resulting intra- or inter-coded block to summer 250 to generate residual block data and to the summer 262 to reconstruct the encoded block for use as a reference picture. In some examples, the mode select unit 243 may analyze each of the reconstructed video blocks to select a best rate-to-distortion ratio through a process commonly referred to as rate-distortion optimization (RDO). Further details of FIG. 2 described below illustrate mode selection techniques in accordance with one or more embodiments of the invention.

A motion estimation unit 242 and a motion compensation unit 244 within prediction unit 241 perform inter-predictive coding of the current video block relative to one or more predictive blocks in one or more reference pictures to provide temporal compression. The motion estimation unit 242 may be configured to determine the inter-prediction mode for a video slice according to a predetermined pattern for a video sequence. The predetermined pattern may designate video slices in the sequence as P slices, B slices or generalized P and B (GPB) slices. The motion estimation unit 242 and the motion compensation unit 244 may be highly integrated, but are illustrated separately for conceptual purposes. Motion estimation, performed by the motion estimation unit 242, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute differences (SAD), sum of square differences (SSD), or other difference metrics. In some examples, the video encoder 120 may calculate values for sub-integer pixel positions of reference pictures stored in reference picture memory 264. For example, video encoder 120 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

The motion estimation unit 242 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the reference picture memory 264. The motion estimation unit 242 sends the calculated motion vector to entropy encoding unit 256 and motion compensation unit 244.

Motion compensation, performed by the motion compensation unit 244, may involve fetching or generating the predictive block based on the motion vector determined by motion estimation, possibly performing interpolations to sub-pixel precision. Upon receiving the motion vector for the PU of the current video block, the motion compensation unit 244 may locate the predictive block to which the motion vector points in one of the reference picture lists. The video encoder 120 forms a residual video block by subtracting pixel values of the predictive block from the pixel values of the current video block being coded, forming pixel difference values. The pixel difference values form residual data for the block, and may include both luma and chroma difference components. The summer 250 represents the component or components that perform this subtraction operation. The motion compensation unit 244 may also generate syntax elements associated with the video blocks and the video slice for use by video decoder 130 in decoding the video blocks of the video slice.

The intra prediction unit 246 within the prediction unit 241 may perform intra-predictive coding of the current video block relative to one or more neighboring blocks in the same picture or slice as the current block to be coded to provide spatial compression. Accordingly, intra prediction unit 246 may intra-predict a current block, as an alternative to the inter-prediction performed by motion estimation unit 242 and motion compensation unit 244, as described above.

In particular, the mode select unit 243 may determine an intra prediction mode to use to encode a current block based on amounts of rate distortion corresponding to a given mode and block. In some examples, the intra prediction unit 246 may encode a current block using various intra prediction modes received from the mode select unit 243, e.g., during separate encoding passes.

The mode select unit 243 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The select unit 243 may calculate ratios from the distortions and rates for the various encoded blocks to determine which intra prediction mode exhibits the best rate-distortion value for the block. According to the HEVC standard, there may be up to 35 intra prediction modes, and each intra prediction mode may be associated with an index.

When performing intra prediction, the mode select unit 243 may analyze an approximate cost associated with each possible intra prediction modes rather than performing full rate distortion analysis. This approximate cost may approximate a rate-distortion cost. Computing a full rate-distortion cost typically requires that the video encoder computes a predicted block using each of the intra prediction modes, determine a difference between each of the predicted blocks and the current block (which is commonly referred to as a "residual block" that specifies the residual pixel values referenced above), transform each of the residual blocks from the spatial domain to the frequency domain, quantize the coefficient values in each of the transformed residual blocks to generate a corresponding encoded video block of coefficients, and then decode the encoded video block, comparing each of the decoded reconstructed video blocks to the current block to determine a distortion metric to finally select the one with the lowest distortion value.

2. INTRA PREDICTION MODES

The intra coding architecture in H.265/HEVC is basically similar to the previous H.264/AVC standard. Its improvements include more flexible ways of splitting a frame into blocks for performing predictions and transforms, an increased number of modes, a higher range of coding block sizes, adaptive smoothing of the reference samples, filtering of the predicted boundary samples, and use of contextual information for intra mode coding, see Lainema.

While the main coding block in H.264/AVC is a macroblock of size 16×16, HEVC uses a more flexible quad-tree structure based on a block called the Coding Tree Block (CTB). A CTB is split into Coding Blocks (CBs), Prediction Blocks (PBs) and Transform Blocks (TBs) to perform prediction and transform. This splitting is more flexible, and is especially useful for higher resolution videos.

Figure 3:
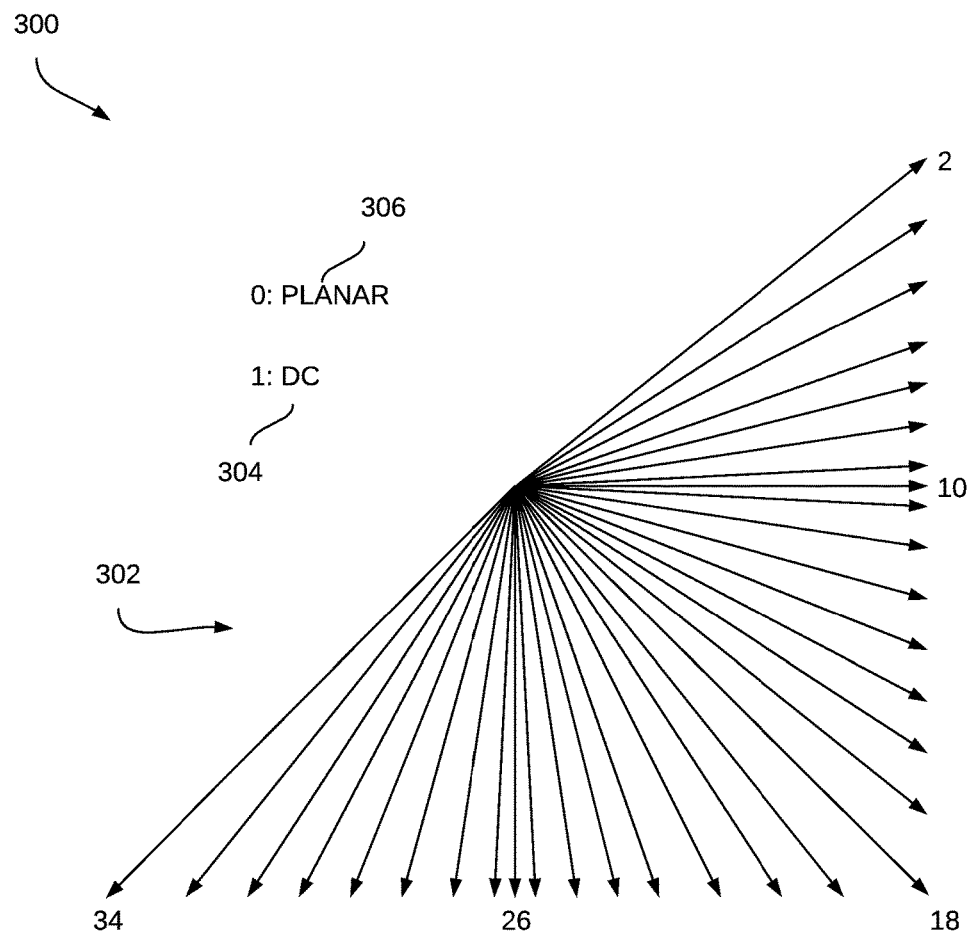
FIG. 3 is a conceptual diagram illustrating intra prediction modes of HEVC (High Efficiency Video Coding)

FIG. 3 shows a conceptual representation 300 of HEVC luma intra prediction modes. In HEVC, 35 intra modes can be used, including angular 302, DC 304, and planar modes 306. The DC mode 304 is used for predicting the homogeneous regions and planar mode 306 is used to produce smooth sample surfaces.

In the first versions of the standard the number of modes was dependent on the size of PB and only a subset of modes could be selected. Now, however, for all sizes of PB, all 35 modes are tested. The decision for coding a block as intra is made at the CB level, but the intra mode is selected for each PB, and it is possible for PBs in the same CB to have different intra modes. After the intra mode is selected, the prediction is done for TBs inside the PB. This means that in determining the prediction signal, the spatially neighboring TBs are used, see Sullivan. For a TB with size N×N, there are 4N+1 samples for prediction from the above, above-right, above-left, left and below-left TBs. Samples from the below-left TB are not always available, and can only be used when they have been processed and decoded beforehand.

Figure 4:
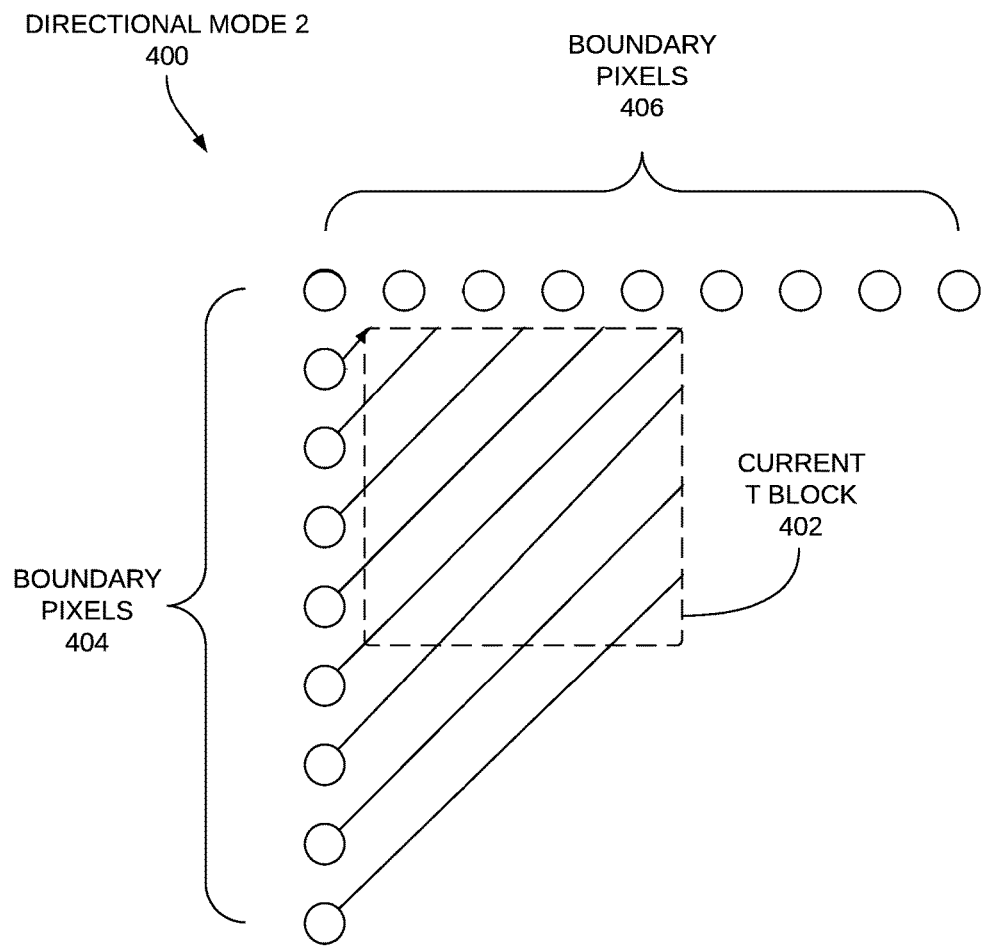
FIG. 4 is a conceptual diagram illustrating an example of an intra prediction mode shown in FIG. 3.

FIG. 4 shows a conceptual representation 400 of a prediction by mode 2, as an example. The $N_{px}^2$ pixels of the current $N_{px} \times N_{px}$ block 402 need to be predicted by boundary pixels 404 and boundary pixels 406. For each of these $N_{px}^2$ pixels, the HEVC standard provides a formula that shows how the pixel is predicted using the 4 $N_{px}$+1 boundary pixels. These formulas are defined based on the selected mode. In this figure it has been shown that by using mode 2 only the boundary pixels 404 are used for the prediction.

HEVC uses the same process for all supported block sizes, which is highly desirable because of the variety of TB sizes and directional modes present. The intra mode decision includes two major processes: RMD, which selects modes with the lowest SATD costs based on, for example, Hadamard transform, to reduce the number of modes for rate-distortion step, and RDO, which chooses the best mode with the lowest-rate distortion cost among the selected modes by RMD. The rate-distortion cost is defined as:

$$J_{RDO} = D_{SSE} + \lambda_{RDO} \times B$$

where $D_{SSE}$ is the distortion and B is the number of bits needed for coding a PB by a specific mode and $\lambda_{RDO}$ is a factor related to the quantization parameter (QP).

3. METHOD FOR FAST INTRA CODING

In this section, we present a fast intra mode decision method in accordance with embodiments of the present invention for HEVC to reduce the encoding complexity in intra mode selection.

Figure 5A:
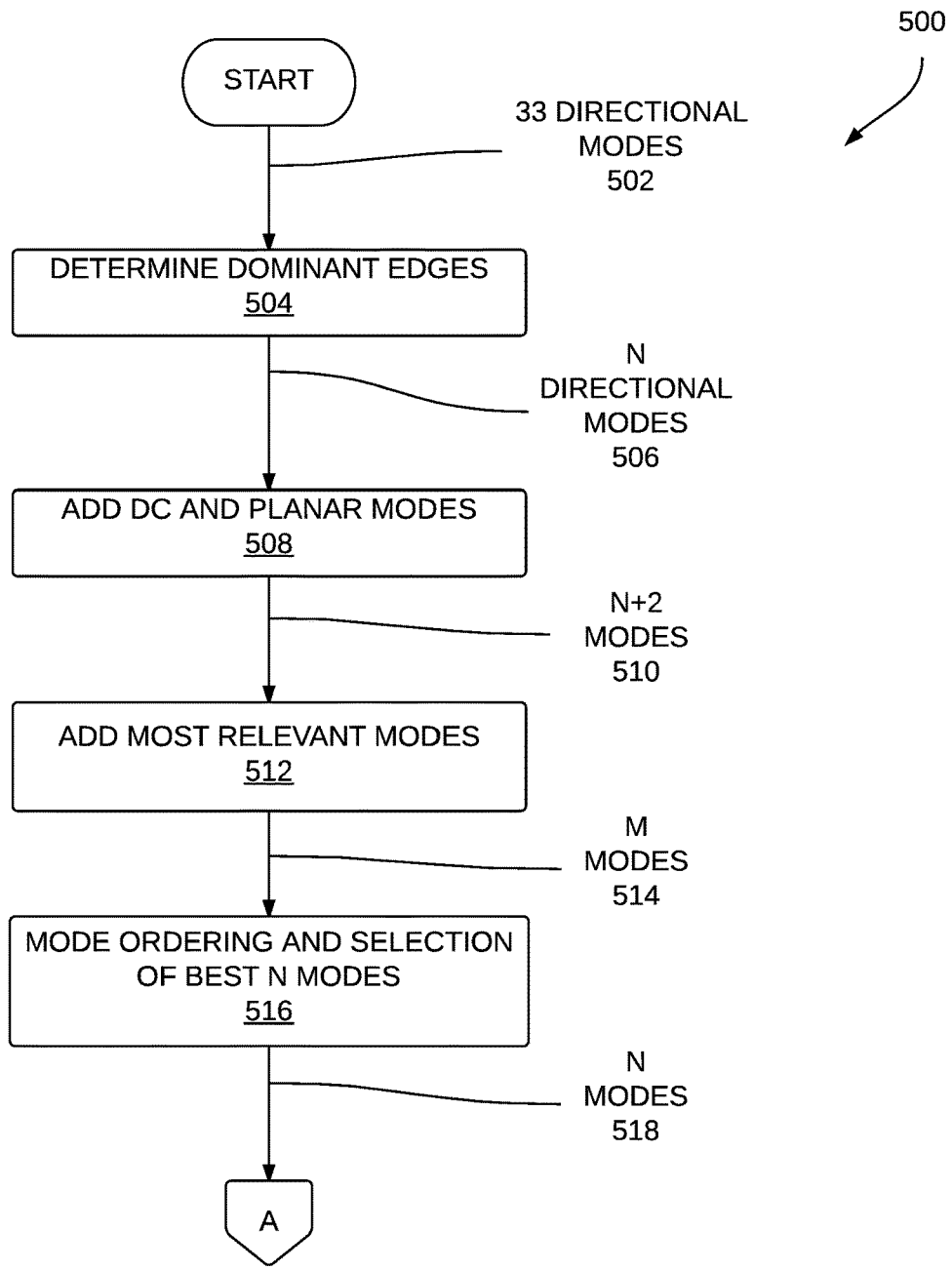
FIGS. 5A and 5B are a flowchart illustrating a method performed by a mode selection unit shown in FIG. 2.
Figure 5B:
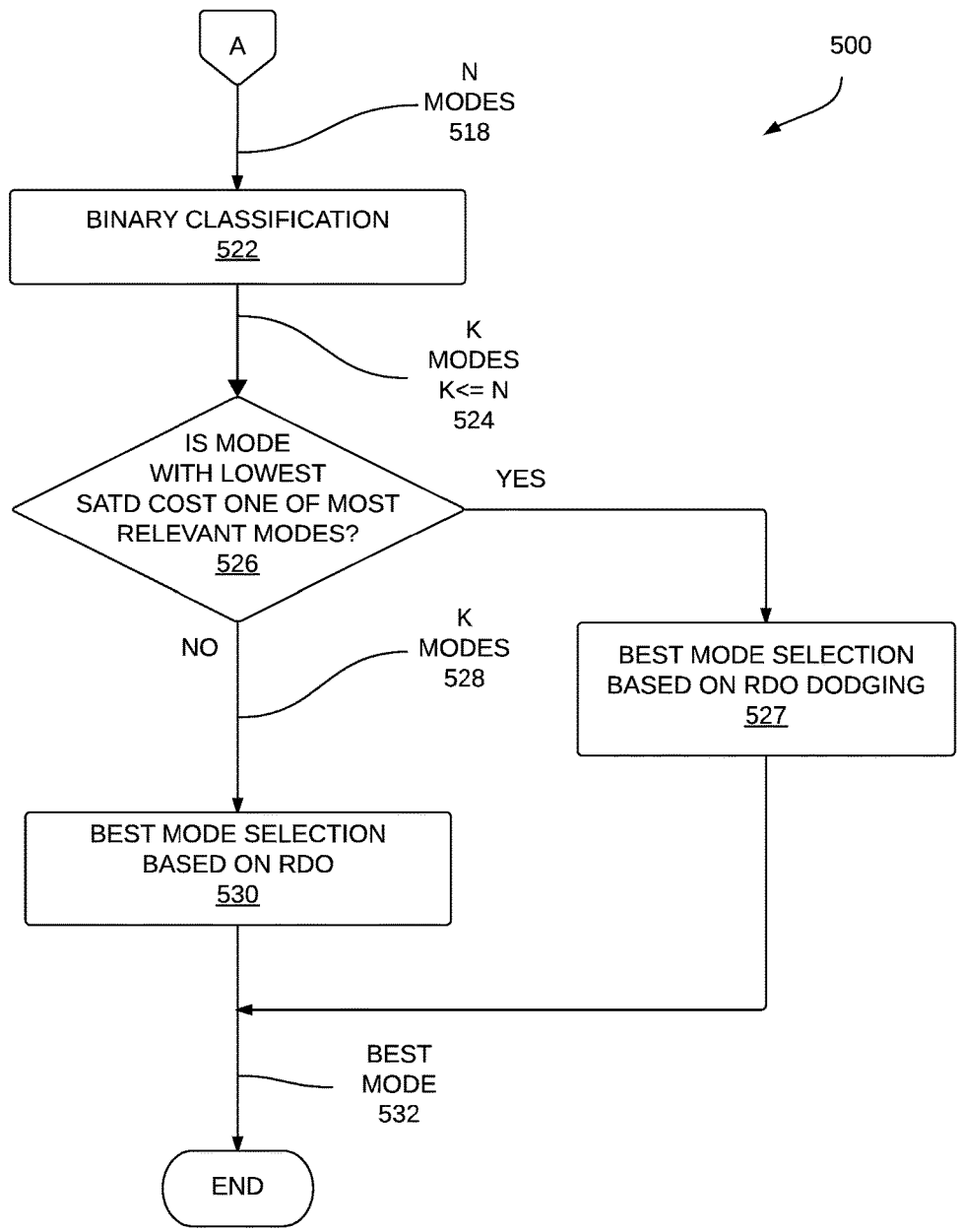

FIGS. 5A and 5B show a flowchart 500 of a method for intra mode in accordance with embodiments of the present invention. Systems for implementing the method for intra mode decision may comprise a memory (not shown) having computer readable instructions stored thereon for execution by a processor (not shown), to execute steps shown in the flowchart 500 and provide functionality as will be described in detail below.

First, using the Sobel operator, we determine 504 the dominant edges from which we identify the N most powerful directional modes 506 by considering three adjacent modes for each detected edge. Next, we add 508 DC and planar modes providing N+2 modes 510. Then we add 512 other most relevant modes from five neighboring blocks providing a list of M modes 514 to enrich the selected modes.

Then we order 516 the list of M modes 514 based on their SATD costs, exclude some costly ones providing N nodes 518. Next we apply 522 a binary classification on the N modes 518 to separate promising modes from the others.

Finally, provided 526 a candidate mode having the lowest SATD cost in one of the relevant modes then we apply 527 RDO dodging, otherwise rate-distortion optimization 530 is used to find the best intra mode 532.

The classification of intra modes based on SATD costs and RDO dodging are described in detail in this patent application, and other steps for intra mode selection have been improved in comparison to existing prior art. Subsequent sections provide further details.

3.1 EDGE DETECTION 504 BASED ON SOBEL OPERATOR

In the current reference implementation of HEVC, HM 15.0, the coding process for PBs starts at the CTB level. From there, the process tests all combinations of PBs and all modes for each of them at different depths. Finally, the best depth, the best PB sizes and the best modes for each PB are selected for the CTB. With this in mind, we determine gradients for each pixel at the CTB level. This allows us to use the edge information for each pixel at any depth and prevent a repetition of the calculations for each PB. Using the gradient, we are able to determine the directions with maximum variation of pixel values. The picture edges are perpendicular to these directions, and they show the dominant angular modes for intra prediction. To compute the gradient, we use the Sobel operator with 3×3 convolution masks, and based on these masks, the two components of the gradient are calculated as follows:

$$\vec{G} = G_x \vec{j} + G_y \vec{i}$$
$$G_x = p_{i-1,j+1} + 2 \times p_{i,j+1} + p_{i+1,j+1} - p_{i-1,j-1} - 2 \times p_{i,j-1} - p_{i+1,j-1}$$
$$G_y = p_{i+1,j-1} + 2 \times p_{i+1,j} + p_{i+1,j+1} - p_{i-1,j-1} - 2 \times p_{i-1,j} - p_{i-1,j+1}$$

-continued
$$|\vec{G}| = \sqrt{G_x^2 + G_y^2}, Ang(\vec{G}) = \mathrm{atan}\left(\frac{G_y}{G_x}\right)$$

We use $|G_x|+|G_y|$ as an estimation of the amplitude and $G_y/G_x$ instead of Ang(G) because the calculations of square root and a tan are resource-intensive. This data is passed to the lower depths to be used in each PB in selecting the best angular modes. At the PB level, based on the gradient information, a main mode is associated for each pixel. The main mode is defined as the closest mode corresponding to the edge. This mode is achieved by comparing $G_y/G_x$ to predefined limits that are pre-calculated based on the specified angles for intra modes in the HEVC standard. The high and low limits for each mode are shown in Table 1.

Figure 6:
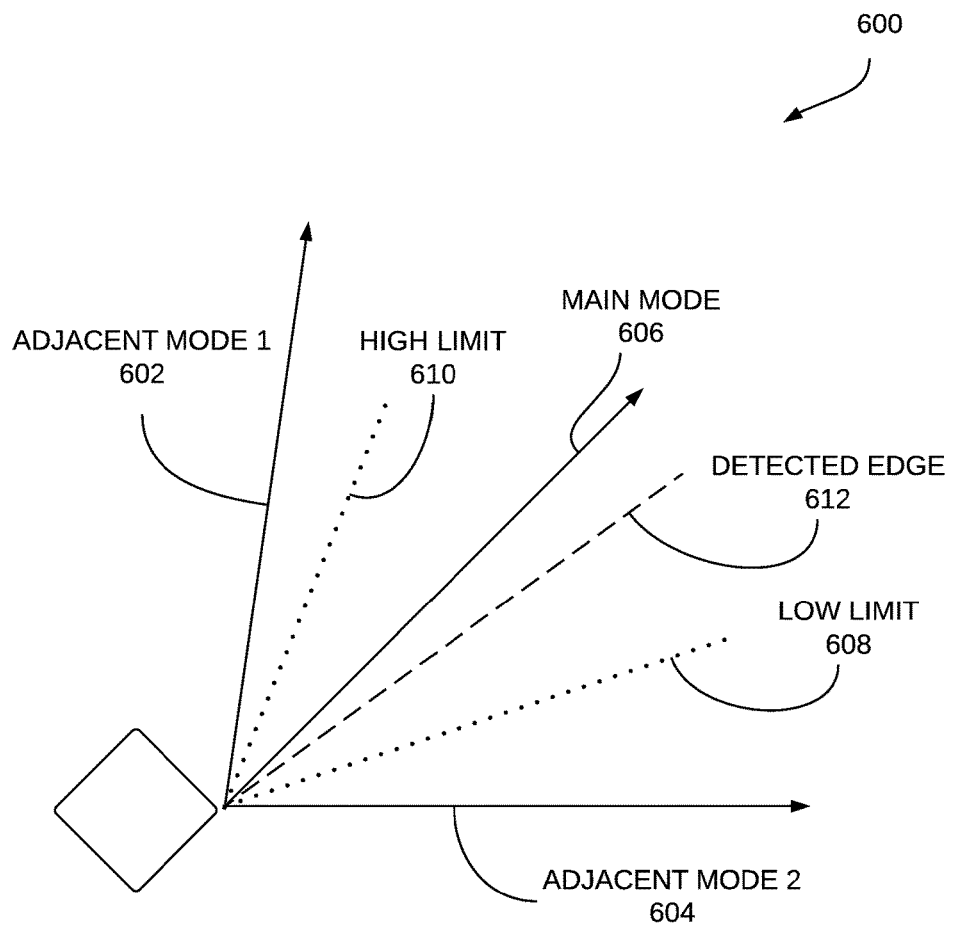
FIG. 6 is a conceptual diagram of an example of edge detected and three main intra prediction modes.

Referring now to FIG. 6, there is shown a conceptual diagram 600 of edge detected and three related modes. To be more accurate in finding modes that provide the best prediction, two adjacent modes 602, 604 are considered, in addition to the main mode 606. This avoids considering only the main mode as the edge is rarely perfectly aligned with it. Therefore, we also give weights to modes adjacent to the main mode based on the direction of the detected edge 612, as is illustrated in FIG. 6. The weights that are given to each of these modes are calculated as follows.

$$mainModeWeight = |G_x| + |G_y|$$

$$modeWFP = \left(\mathrm{atan}(highLimit) - \mathrm{atan}\left(\frac{G_y}{G_x}\right)\right) / (\mathrm{atan}(highLimit) - \mathrm{atan}(lowLimit))$$

$$modeWeightFactor = \left(highLimit - \frac{G_y}{G_x}\right) / (highLimit - lowLimit)$$

$$adjacentMode1Weight = (1 - modeWeightFactor) \times (|G_x| + |G_y|)$$

$$adjacentMode2Weight = modeWeightFactor \times (|G_x| + |G_y|)$$

In the above formulas, modeWFP is the perfect form of the mode weight factor and gives weights of 0.5 for two adjacent modes if the edge sits exactly on a mode. However, as previously mentioned, computing the a tan function is avoided, and an approximated formula is used (modeWeightFactor). Also, the horizontal mode (mode 10) is considered as a special case, and the weight factor for this mode is as follows:

$$modeWeightFactor = 0.5 \times \left(1 + 40.73548 \left|\frac{G_y}{G_x}\right|\right)$$

This is because for this mode, there is infinity for the low limit 608 or high limit 610 and the normal formula cannot be applied in this situation. We can see in Table 1 that there are two intervals that map to mode 10: $-\infty$ to $-40.73548$ and $40.73548$ to $\infty$. Following these computations, we accumulate the weights of the modes by checking all pixels of the PB, while each pixel increases the weight of three modes. Finally, we obtain a histogram that shows the accumulated weights of 33 directional modes for the whole PB. From this histogram, we consider the N most powerful modes as the best candidates selected by edge detection and go to the next steps to add some other modes to enrich this set of N modes. The parameter N is determined based on the block size (see section 4).

TABLE 1

High and low limits of $G_y/G_x$ for angular modes

| Mode | lowLimit | highlimit | Mode | lowLimit | highLimit |
|---|---|---|---|---|---|
| 2  | −1.15928  | −1        | 18 | 0.86261  | 1.15928  |
| 3  | −1.53711  | −1.15928  | 19 | 0.65057  | 0.86261  |
| 4  | −1.98666  | −1.53711  | 20 | 0.50336  | 0.65057  |
| 5  | −2.59240  | −1.98666  | 21 | 0.38574  | 0.50336  |
| 6  | −3.61354  | −2.59240  | 22 | 0.27674  | 0.38574  |
| 7  | −5.76314  | −3.61354  | 23 | 0.17352  | 0.27674  |
| 8  | −11.61240 | −5.76314  | 24 | 0.08611  | 0.17352  |
| 9  | −40.73548 | −11.61240 | 25 | 0.02455  | 0.08611  |
| 10 | ∞         | −40.73548 | 26 | −0.02455 | 0.02455  |
| 10 | 40.73548  | ∞         | 27 | −0.08611 | −0.02455 |
| 11 | 11.61240  | 40.73548  | 28 | −0.17352 | −0.08611 |
| 12 | 5.76314   | 11.61240  | 29 | −0.27674 | −0.17352 |
| 13 | 3.61354   | 5.76314   | 30 | −0.38574 | −0.27674 |
| 14 | 2.59240   | 3.61354   | 31 | −0.50336 | −0.38574 |
| 15 | 1.98666   | 2.59240   | 32 | −0.65057 | −0.50336 |
| 16 | 1.53711   | 1.98666   | 33 | −0.86261 | −0.65057 |
| 17 | 1.15928   | 1.53711   | 34 | −1       | −0.86261 |

3.2 ADDING 508 DC, PLANAR AND MOST RELEVANT MODES (MRMS)

Since DC and planar are very probable modes in intra prediction, S. Yan, L. Hong, W. He and Q. Wang, "Group-Based Fast Mode Decision Algorithm for Intra Prediction in HEVC", *International Conference on Signal Image Technology and Internet Based Systems*, August 2012, and because the edge detection algorithms can only check the angular modes, we add these two modes to our list of candidate modes from the previous step. Then, to exploit the spatial correlation among blocks, we check the best modes of the five neighboring blocks and add them to the list if they are relevant; i.e., if based on their direction, they are likely to be the best mode of the current block. For example, if the mode of the above block is vertical or near-vertical, then it is added to the list. We do the same for the left block if its mode is horizontal or near-horizontal. Similarly, the above-right, above-left and below-left blocks are processed in the same manner. For each of these neighboring blocks, 2n+1 modes are defined, which we call most relevant modes (MRMs), and if a neighboring block's intra mode corresponds to one of these modes, then it is considered for the next step.

Figure 7:
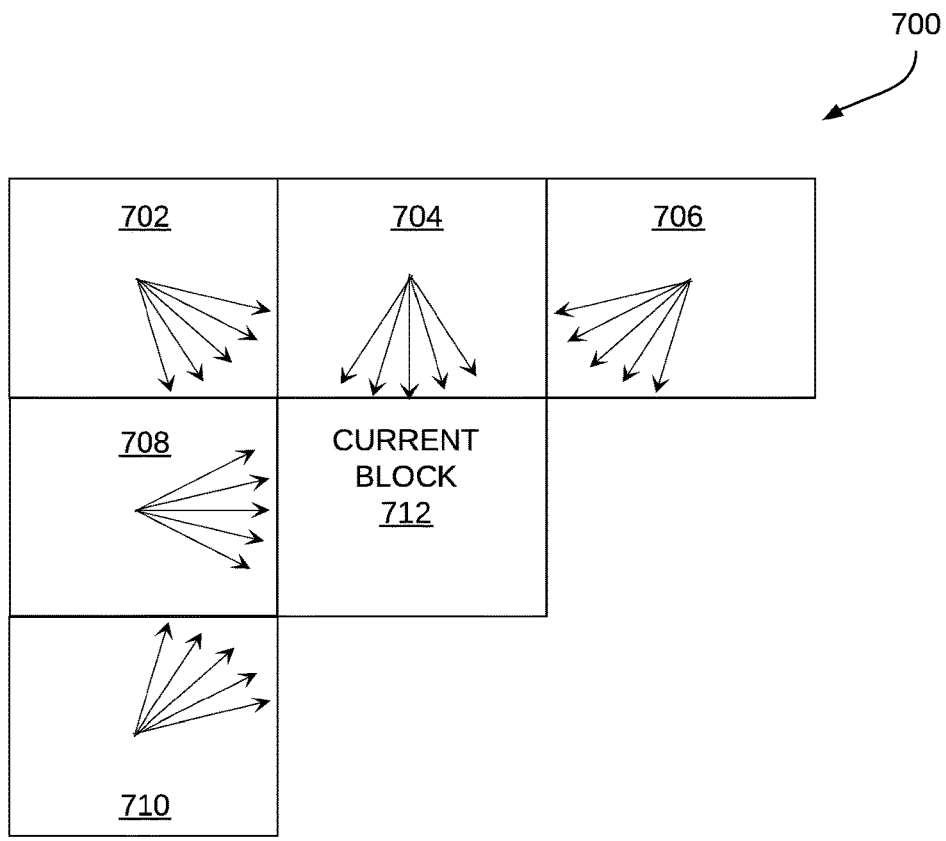
FIG. 7 is a conceptual diagram of most relevant modes of neighboring blocks of a current block.

FIG. 7 shows a conceptual representation 700 of the most relevant modes of the neighboring blocks 702, 704, 706, 708, 710. The arrows show for each neighboring block the directions considered for addition in the candidate list. For example, for the above-left block 702 with n=2 the MRMs are 16, 17, 18, 19 and 20 (diagonal or near-diagonal in the direction of top-right to bottom-right), and if that block selects one of these modes, then the mode is added to the list of candidates for the current block 712. Similarly, for the left block 706 with n=2 the MRMs are 8, 9, 10, 11 and 12 (horizontal or near-horizontal), and if that block selects one of these modes, then the mode is added to the list of candidates for the current block 712. In this step, in addition to DC and planar, a minimum of zero and a maximum of five modes are added to our list of selected modes, and so there are M modes, where N+2≤M≤N+7.

3.3 MODE ORDERING 516, BINARY CLASSIFICATION 522 AND RDO DODGING 526

After adding MRMs, we order the selected modes from the previous step based on the SATD costs, going from the lowest cost to the highest cost, and select the first N modes. The modes are then classified into two classes: powerful contenders with lower costs and weak ones with higher costs. We keep the powerful modes and pass them on to the next step and exclude the weak modes from further processing. This classification could be based on different criteria, but we have found that if a dominant gap exists among the SATD costs, we can efficiently remove the modes with higher costs from the very time-consuming RDO process without affecting the rate-distortion performance. In other words, it is wasteful to test candidates whose costs are much higher than others. For example, if two candidates have very low costs while the others have significantly higher costs, it is often a waste of time to evaluate all candidates by the computationally expensive RDO, as only the two low-cost candidates usually win.

Figure 8:
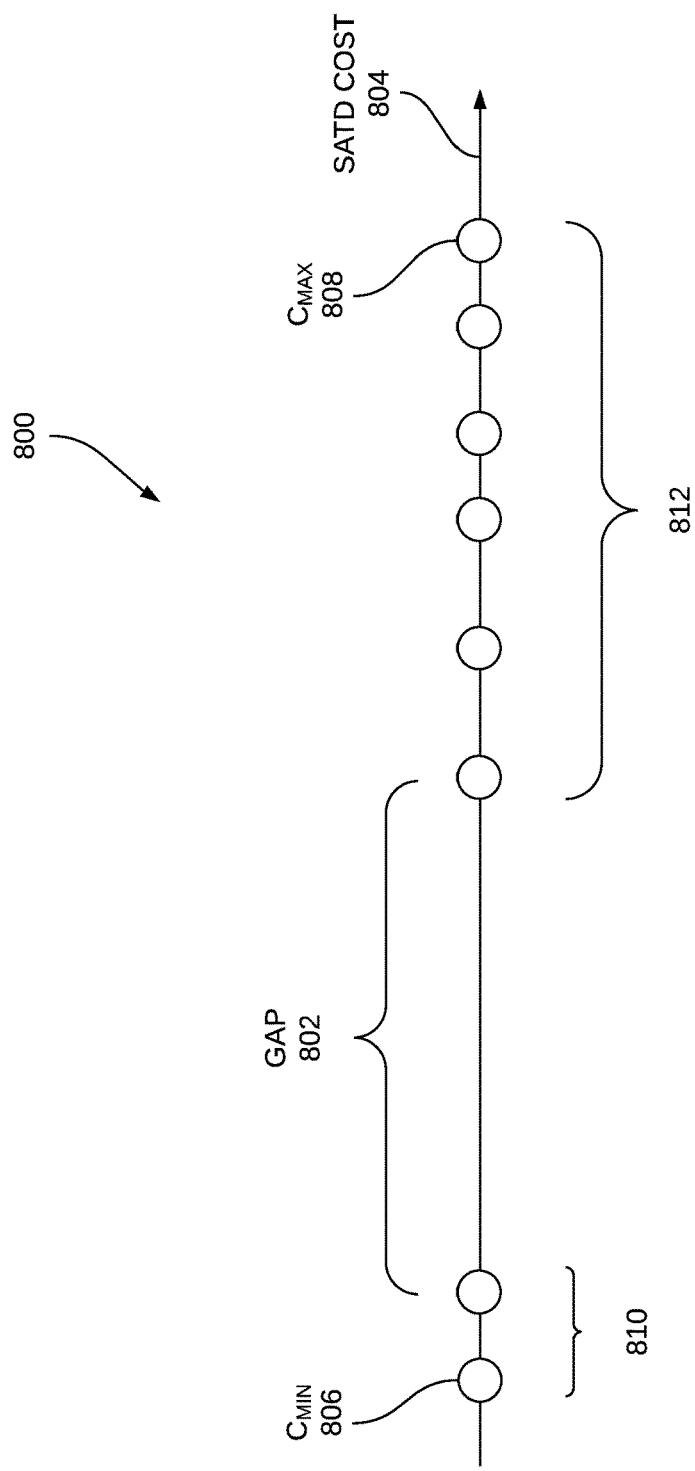
FIG. 8 a conceptual drawing of a detected gap between classes of lower cost intra prediction modes and higher cost intra prediction modes.

FIG. 8 shows a conceptual drawing 800 of a detected gap 802 between classes of lower cost modes 810 and higher cost modes 812 among SATD costs 804 where $C_{min}$ 806 is the lowest cost and $C_{max}$ 808 is the highest cost. Finding such a gap 802 can significantly decrease the time consumption for mode decision in intra coding. It reduces the number of modes to K, where K≤N. K=N occurs when no gap is found. This gap could be a fixed one for all situations or could be adaptive based on the block size, quantization parameter, or absolute minimum and maximum cost values or any other criterion. In the embodiments of the invention, we consider adaptivity based on block size, and the difference between the maximum and minimum cost values. Other parameters could be applicable. The gap is defined as follows:

$$Gap = \alpha \times (C_{max} - C_{min})$$

In this formula, $\alpha < 1$ is an empirical parameter, and is adjusted based on the block size (see section 4). $\alpha$ is inversely proportional to the number N of modes to test. There needs to be at least 3 modes, N>=3, for there to be a meaningful gap.

$\alpha * (C_{max} - C_{min})$ should be greater than $(C_{max} - C_{min})/(N-1)$ which corresponds to an average separation of all the SATD values. Preferably a value of a is chosen to be about 2 to 3 times the average separation.

In the above, we look for the gap between consecutive modes. Suppose that the N candidates (sorted by increasing SATD values) are $m_1, m_2 \ldots m_N$ with SATD costs of $SATD_1$, $SATD_2 \ldots SATD_N$. In the above version we check the following inequality starting from i=1 to i=N−1 and if it is fulfilled we take the modes $m_1$ to $m_i$ as the promising modes.

$$SATD_{i+1} - SATD_i > GAP$$

Before entering the RDO, we apply another step which we call RDO dodging, which again exploits the modes from five neighboring blocks to bypass the RDO process under certain conditions. The idea is that if the mode with the lowest SATD cost is one of the most relevant modes, then it is highly likely to be the best intra mode for the current block. For instance, if the lowest cost candidate for the current block is the vertical mode and the best mode of the above block is also vertical, we choose this mode as the final decision, and RDO is omitted. To create the set of most relevant modes at this step, we consider 2m+1 modes from neighboring blocks similar to section 3.2. If the candidate with the lowest cost after ordering and classification is one of these relevant modes, it is selected as the best mode; otherwise, all K candidates are tested by RDO and the candidate with lowest RDO cost is selected as the final mode.

The RDO dodging step can also be performed before the classification based on gap. When it is performed before, we can combine the classification based on GAP with the RDO step. In this alternative embodiment, we sort the candidates in increasing order of SATD values. Then, we evaluate successively the RDO cost of each candidate and check the following inequality to determine if we can early terminate the RDO process:

$$SATD_{i+1} - SATD_{best} > GAP$$

Where $SATD_{best}$ is the SATD cost of the mode with lowest RDO cost among modes $m_1 \ldots m_i$. So in this approach, for the each step, if the inequality is not fulfilled, we calculate the RDO cost for $m_{i+1}$ and select the mode with lowest RDO cost among $m_1 \ldots m_{i+1}$. The SATD of this mode would be $SATD_{best}$ that is used for the next comparison. This process is summarized in Algorithm 1.

---

Algorithm 1 Algorithm for finding the best intra mode after RDO dodging when we combine the classification based on GAP with the RDO

---

```
i=1
Evaluate RDO_i the RDO of mode m_i
SATD_best = SATD_i
RDO_best = RDO_i
bestmode=i
i=i+1
while (i<N)
    if (SATD_i - SATD_best > GAP)
        return bestmode, RDO_best
    else
        Evaluate RDO_i the RDO of m_i
        if (RDO_i < RDO_best)
            SATD_best = SATD_i
            RDO_best = RDO_i
            bestmode=i
    i=i+1
return bestmode, RDO_best
```

---

As it is discussed herein above, we observed in our experiments with different video sequences that there is a relation between SATD cost and RDO cost. Considering this point and noting the fact that SATD process is much less complex than RDO process leads to this result that we can approximately determine the order of RDO costs based on the SATD costs. Nonetheless, specifying this order is not perfect and the most important consequence of this imprecision is that the mode with lowest SATD cost is not necessarily same as the mode with lowest RDO cost, which is the best mode. One approach to solve this problem is selecting K modes with lowest SADT costs so best mode, with high probability, lies in the set of these selected candidates.

The main idea comes from our observations of the RDO cost distributions. According to these observations, the RDO cost distributions for blocks that their SATD costs reside at a specific range match some well-known distributions. For finding the best distribution, we have divided the whole range of SATD cost to multiple bins and for each bin the histogram of the associated RDO cost is obtained.

Figure 9:
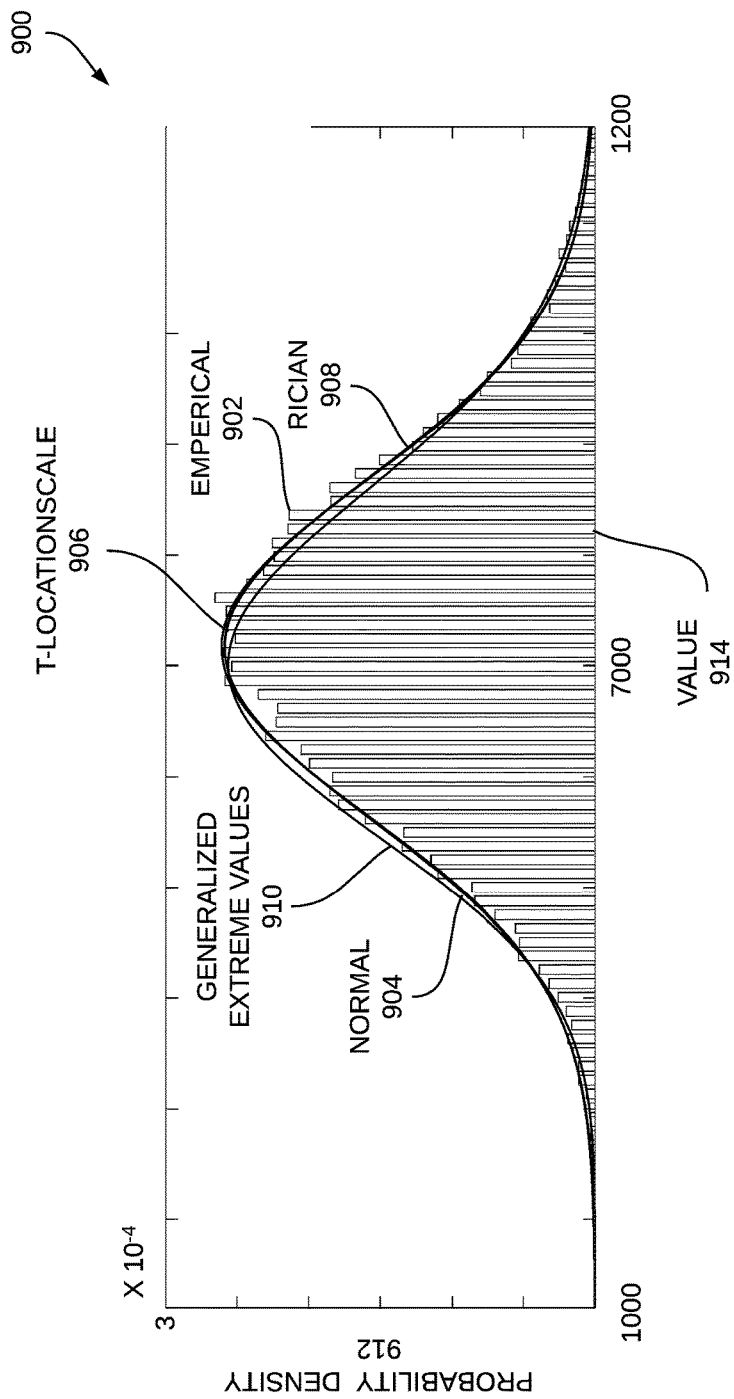
FIG. 9 a histogram of probability density related to one range of SATD.

Referring to FIG. 9, there is shown a histogram 900 of probability density 912 and SATD cost value 914. We have used 17 different probability distributions including normal probability distribution 904, t-location scale probability distribution 906, Rician probability distribution 908, and generalized extreme value probability distribution 910 shown, to find which of them best describe the given histogram. Based on our observations, in most cases the normal probability distribution 904 is among the top three and fits very well with RDO cost histograms. Accordingly, our approach is based on modeling the RDO costs as normal probability distributions 904. Basically, for a SATD value, we can associate a normal probability distribution representing the RDO cost. By doing so, we go to the next step that lets us select the most promising modes based on SATD costs and avoiding RDO for non-promising candidates.

Figure 10:
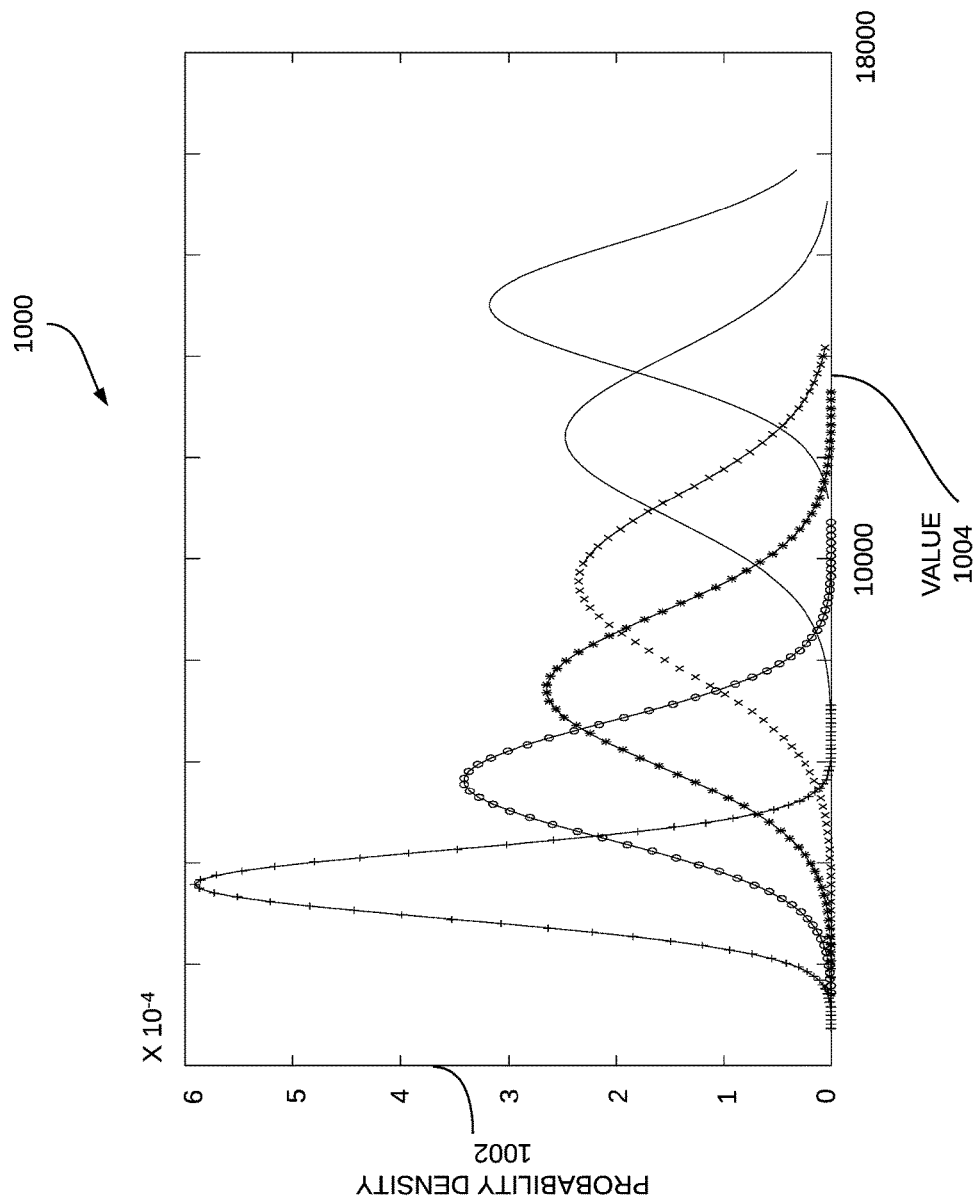
FIG. 10 is a graph of normal fitted distribution of RDO (Rate Distortion Optimization) cost of different bins of the SATD (Sum of Absolute Transformed Differences) range.

For applying this modeling to our problem, we need to have normal fitted distributions for RDO cost of different bins of the SATD range. FIG. 10 shows a graph 1000 these distributions of probability 1002 and value 1004. For two reasons, while coding a specific block, the achieved distributions are more separable than those that are illustrated in FIG. 10. First, not all the SATD bins occur for a specific block while here RDO distributions associated for all the bins are shown. Second, we have already removed some modes and as a result some SATD bins by our edge detection algorithm. Thus, we are going to select K distributions among M distributions while M≤35. If we consider all intra modes, M is equal to 35 and if we exclude irrelevant angular modes M will be less than 35 and there is no need to compute SATD cost for the excluded modes. This results in an additional time reduction.

The set of selected candidates before applying RDO analysis is called ψ that is defined as:

$$\psi = \{DC + Planar + MRMs + \text{Selected modes based on edge detection}\} = \{m_1, m_2, \ldots m_M\}$$

We add DC and planar modes to our list of candidate modes from the previous step because these two modes are very probable modes in intra prediction, and because the edge detection algorithms can only check the angular modes. Then SATD costs are computed for these M modes and bins associated for these costs are determined. Based on the model, for each bin there is an RDO cost distribution, thus we will have M normal distributions which possibly overlap. We consider the mode associated to the distribution with lowest mean as the temporary best mode ($m_{SATD-min}$) and compare it with other ones to classify them as promising or non-promising candidates. At the end, promising modes form a set called P as follows:

$$P = \{\text{Promising modes based on normal probability distributions analysis}\} = \{m_1, \ldots m_K\}$$

While $$P \subseteq \psi \text{ and } K \leq M$$

$m_{SATD-min}$ is always included in P. So P has at least one and at most M members. To show how the comparison between two distributions is performed, we give the following analysis on two normal probability distributions and their linear combination. This shows how we are going to select the promising modes based on their SATD/RDO cost analysis.

Figure 11:
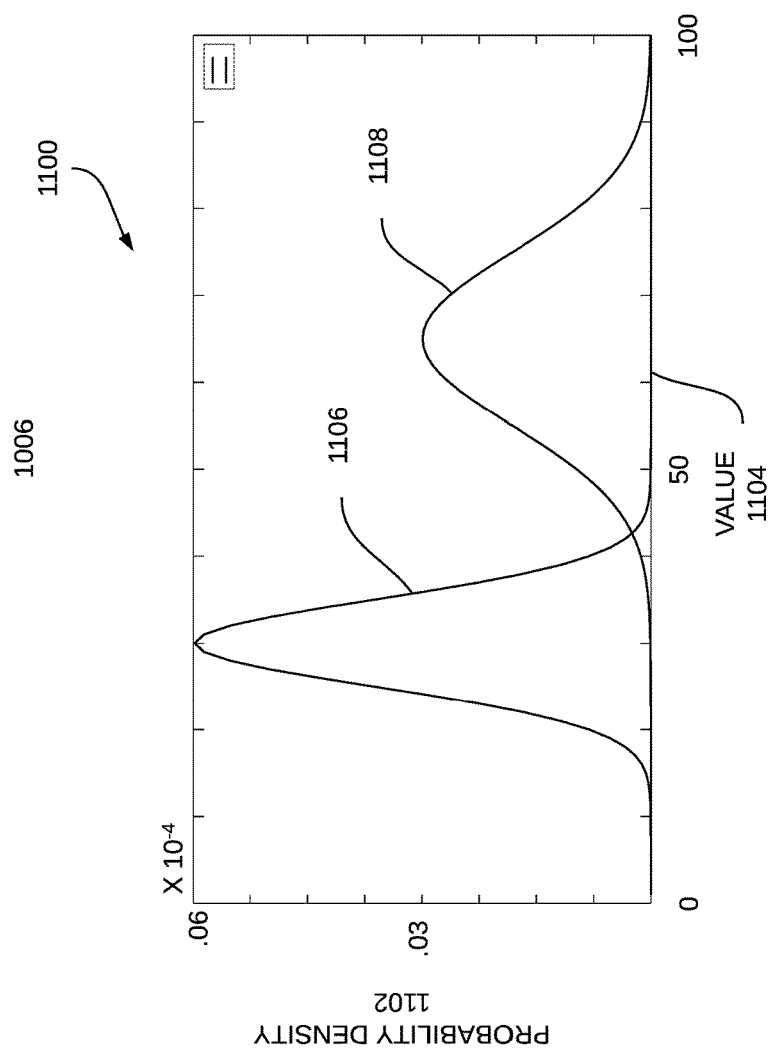
FIG. 11 is a graph of two overlapping normal probability distributions.

Referring to FIG. 11, consider the two overlapping normal probability distributions X 1106 and Y 1108 of the probability distribution diagram 1100 showing probability density 1102 and value 1104.

If X and Y are two independent normal variables such that:

$$X \sim N(\mu_x, \sigma^2_x) \text{ and } Y \sim N(\mu_y, \sigma^2_y)$$

Then $$X + Y \sim N(\mu_x + \mu_y, \sigma^2_x + \sigma^2_y)$$

$$aX \sim N(a\mu_x, a^2\sigma^2_x)$$

$$aX + bY \sim N(a\mu_x + b\mu_y, a^2\sigma^2_x + b^2\sigma^2_y)$$

In our problem, we are interested in computing P (X<Y) and compare it with a confidence level (CL). If this probability is less than the desired confidence level (i.e. if it is not probable enough that a realization of Y will be higher than a realization of X), we add the mode associated with distribution Y to set P. Otherwise, it means that we can safely exclude the mode associated with Y distribution from further processing and RDO cost computations. In general, a confidence level refers to the probability that the value of a parameter falls within a specified range of values. If our case, P(X<Y) with confidence level CL=x % means that for multiple realizations of X and Y, we will observe X<Y at least x % of the time (or that we can be x % sure that for stochastic processes X and Y, we will observe X<Y). The confidence level provides a tradeoff between complexity and quality. We use the term "not probable enough" or "not probable" or "low probability" to describe an event having a probability of occurring which is below a desired confidence level CL (i.e. if we observe multiple realizations of a process, the event would occur less than CL % of the time). In our application, when we cannot guarantee, with a certain confidence level, that a candidate will have a higher RDO than the one with minimum approximate cost, then the event that this candidate will have a higher RDO than the one with minimum approximate cost is not probable enough and therefore that candidate is added to the list of promising candidates (i.e. we can't exclude it from the list of candidates on which RDO is computed since we are not confident enough that it will have an RDO higher than the one with minimum approximate cost). The term "not probable enough" depends on the desired complexity and visual quality tradeoff in the same way that the confidence level does. Also, it has the usual meaning that if the number of occurrences of an event of interest compared to the number of trials (e.g. the number of times we roll a dice and get 6 compared to the number of times we roll a dice) is not high enough relative to the expectation then the event is "not probable enough". In the embodiments of the invention, the confidence level has been preferably chosen in a range of 0.6-0.7, and less preferably in a range of 0.5-0.8, and yet less preferably in a range of 0.2-0.9.

To compute this probability we define $W=X-Y$ as a new distribution. Based on the analysis given above on two normal probability distributions, W is normal with mean of $\mu_x-\mu_y$ and variance of $\sigma^2_x+\sigma^2_y$. Accordingly, we have a normal probability distribution W and we want to compute P (W<0). By knowing the mean and variance of W, computing this probability is straightforward. The overall algorithm for selecting the modes of the set P is shown in Algorithm 2. In this algorithm X and $Y_i$ are the RDO cost distributions associated with $m_{SATD-min}$ and $m_i$ (a member of set $\psi$) respectively.

---

Algorithm 2 Algorithm for selecting the promising modes based on RDO distributions

---

// exclude irrelevant angular modes by edge detection and form set $\psi$
// include DC, planar and most relevant modes form neighboring blocks
$\psi$ = {DC + Planar + MRMs + Selected modes based on edge detection} = $\{m_1, m_2, \ldots m_M\}$
  P = $\{m_{SATD-min}\}$
  for $1 \le i \le M$ do
    if $m_i \ne M_{SATD-min}$ then
      if P $((W_i = X - Y_i) < 0) <$ CL then
        P = P + $m_i$

---

-continued

Algorithm 2 Algorithm for selecting the promising modes based on RDO distributions

--- end if
    end if
    i++
  end for

---

In summary, a first set of intra prediction modes is selected, preferably including DC intra prediction modes, planar intra prediction modes, and MRM intra prediction modes from neighboring blocks. Then, an approximated cost of each of the first set of intra prediction modes is calculated using a SATD, SSE, or SAD algorithm. Then, a second set of intra prediction modes including an intra prediction mode in the first set of intra prediction modes having a minimum approximate cost compared to other intra prediction modes in the first set of intra prediction modes is created. Then, for each of other intra prediction modes in the first set of intra prediction modes: a probability $P((W_i=X-Y_i)<0)$ is calculated, where X is a probability distribution associated with the intra prediction mode having the minimum approximate cost and $Y_i$ is a probability distribution associated with one of the other intra prediction modes in the first set of intra prediction modes, and provided that P is less than a confidence level, typically about 0.6 (i.e. if it is not probable enough that a realization of $Y_i$ will be higher than a realization of X), the one of the other intra prediction modes in the first set of intra prediction modes is added to the second set of intra prediction modes. Then an RDO (Rate Distortion Optimization) cost for each intra prediction mode in the second set of intra prediction modes is calculated. Finally, an intra prediction mode from the second set of intra prediction modes having a minimum RDO cost compared to other intra prediction modes in the second set of intra prediction modes is selected.

Alternatively, instead of computing a probability considering two Gaussian distributions as shown above, we can compute the probability between a Gaussian distribution and a specific value. For instance, we could evaluate the RDO of the candidate with lowest SATD and then evaluate the probability that a candidate mode with probability distribution $Y_i$ has higher value than that RDO is less than a certain confidence level. If this is the case, the candidate mode is added to the second set of intra prediction modes. So if $RDO_{SATD-min}$ is the RDO associated with mode $m_{SATD-min}$, we add mode $m_i$ to the second set of intra prediction modes if $P(RDO_{SATD-min}<Y_i)$ is less than a confidence level. In general, we are calculating a probability that one of the other intra prediction modes in the first set of intra prediction modes, based on its approximate cost value, has higher RDO cost than the mode having a minimum approximate cost (which is either SATD, SAD, SSE, etc.). If such probability is low enough (i.e. the described situation is not probable enough), we need to add that mode to the set of candidates for which RDO needs to be evaluated (set of promising modes). This can be achieved by comparing two Gaussian distributions, comparing a Gaussian distribution with a value, or other means that someone skilled in the art may develop. This can also be achieved in a rough manner using a GAP approach as described above. Although it is not computing a probability per se, the GAP idea behaves the same by adding to the set of promising modes the candidates for which there is not a large difference between their approximate cost values and excluding those for which, because of the GAP, there is a substantial difference. The GAP size behaves similarly to the confidence level; a larger GAP corresponds to a larger confidence level. Large confidence levels lead to higher video quality but reduce speedup (increase computations).

In inter coding, we face the same problem as intra coding where the RDO needs to be performed on several candidate modes. This is computationally intensive and we can reduce the computations by taking a similar approach. Indeed, for inter coding as well, we can reduce the list of candidate modes on which RDO is performed based on their approximate cost values. As for intra coding, we create a first set of inter prediction modes and compute an approximate cost for each candidate mode (prediction mode) in that set (using SAD, SATD, SSE, etc.). Then, we identify the candidate with minimum approximate cost. Then we calculate a probability that one of the other inter prediction modes in the first set of inter prediction modes has higher RDO cost than the mode having a minimum approximate cost. Again, if such probability is low enough, we need to add that mode to the set of candidates for which RDO needs to be evaluated (set of promising modes). Finally, RDO is performed on the set of promising modes to determine the best mode.

The modeling that we have presented, which is using a normal distribution, is related to predicting RDO cost based on an approximate cost such as SATD cost. It should be noted that the SATD cost ($SATD_{cost}$) is defined as:

$$SATD_{cost} = SATD + Lambda*(\text{prediction rate})$$

In the above formula prediction rate is the number of bits that we require to signal the mode. Similarly the RDO cost ($RDO_{cost}$) is computed using SSE and an additional rate. The formula is:

$$RDO_{cost} = SSE + Lambda^2*(RDO_{rate})$$

In this formula $RDO_{rate}$ is the number of bits that is required to send the signaling and residuals bits. Although we have modeled the $RDO_{cost}$ based on the $SATD_{cost}$ (that is not a pure SATD), various other modeling could be used to predict the $RDO_{cost}$. For instance the $RDO_{cost}$ can also be modeled from SATD only. SSE can also be modeled from SATD only. It is possible to model $RDO_{cost}$ using various other approximate cost functions using various models such as Gaussian, Rician, t-location scale, etc. as long as the model is accurate enough to fit empirical data. Note for the modeling of the $RDO_{cost}$ based on the $SATD_{cost}$, a confidence level (CL) of preferably 0.6 to 0.7 provided a good tradeoff between computational complexity and visual quality (lower CL will increase speed and decrease quality and higher CL will do the opposite). For other modelings or when applying the method to inter coding, other CL values may need to be evaluated empirically. Indeed, in theory CL can go from 0 to 100% (0 would lead to add only the candidate with minimum approximate cost to the list of promising modes since not more candidate would be added to that list; 100% would lead to add the candidate with minimum approximate cost and all the other candidates to the list of promising modes). But a confidence level between these two extremes provide the best quality-complexity compromise (which we selected around 0.6 based on our modeling, empirical results and own opinion). Alternatively, the confidence level may be selected between 0.4-0.7 or less preferably between 0.2-0.9.

4. EXPERIMENTAL RESULTS

Figure 12:
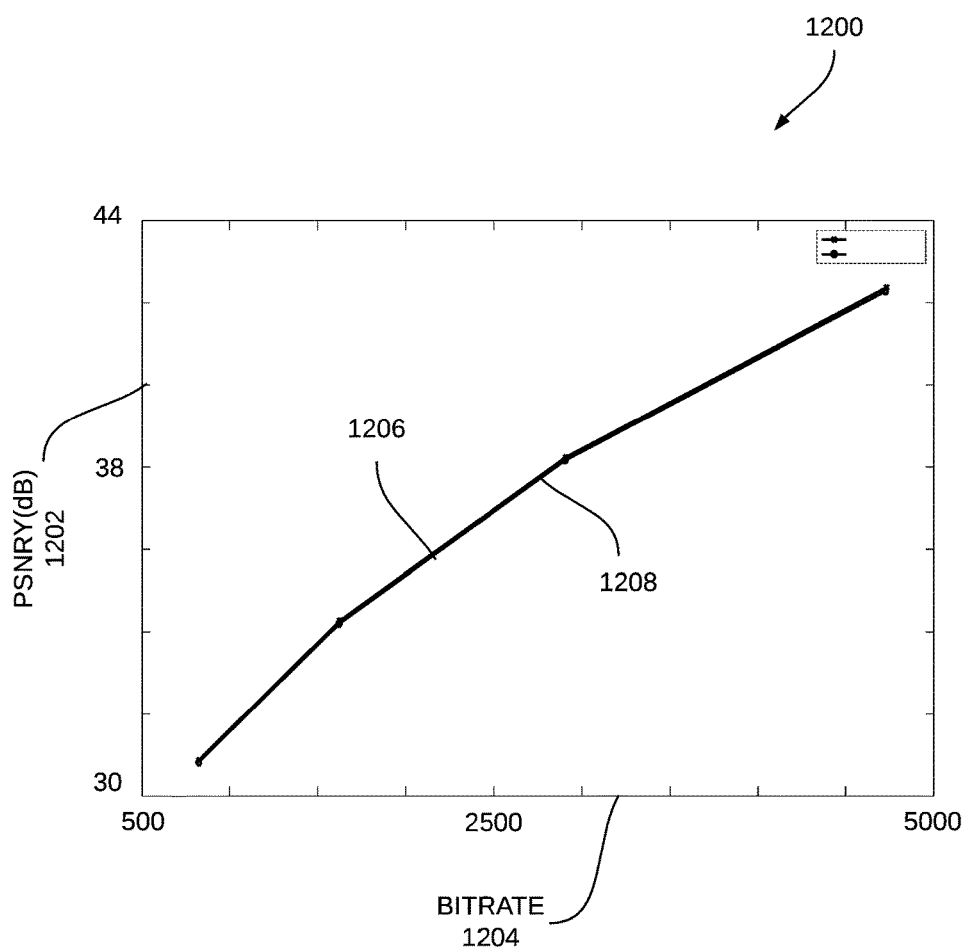
FIG. 12 is a graph illustrating experimental results of rate distortion performance of an embodiment of the invention.

The proposed method was implemented in the HEVC test model HM 15.0. The implementation platform was an Intel® i7-3770 CPU-3.40, 12 GB of RAM, running Windows 7. We used the 100 first frames of the recommended sequences in F. Bossen, "Common Test Conditions and Software Reference Configurations", JCTVC-I1100, 12$^{th}$ Meeting, Geneva, Apr. 27-May 7, 2012 to implement our proposed method. HM was configured in All-Intra mode, and run for quantization parameters (QP) 22, 27, 32 and 37. The parameters of the method were: N=8 and $\alpha$=¼ for block sizes 4×4 and 8×8 and N=3 and $\alpha$=⅔ for block sizes 16×16, 32×32 and 64×64. Also, n and m were set to 3 and 1 for selecting the most relevant modes. Table 2 shows the results of these experiments in terms of BD-Rate, BD-PSNR$_Y$, G. Bjontegaard, "Calculation of Average PSNR Differences between R-D Curves", VCEG-M33, April 2001, and time reduction, in comparison with HM 15.0. Using Bjontegaard metrics, the table shows the average differences in rate-distortion performance. The time reduction is calculated for each QP, and the average over all QPs is presented in the table. According to the experimental results, we achieve an average 35.6% time reduction over all video sequences, and up to 39.2% in comparison with the anchor implementation. The main contributors to this time reduction are a decrease in the number of modes for SATD calculations in the RMD step and a decrease in the number of modes in the extremely time-consuming RDO process. Compared to other works that focus on intra mode decision, our method achieves higher time reductions, as Zhao and Chen provide about 20% and 28%, respectively. Moreover, the two main components of our method, binary classification and RDO dodging, are very easy to implement. The price we pay for this time reduction is, on average, a 0.059 dB loss in BD-PSNR$_Y$ and a 1.07% increment in the BD-Rate, which only slightly affects the rate-distortion performance. To justify this, FIG. 12 shows a graph 1200 of PSNR$_Y$(dB) 1202 and bitrate 1204 of the RD curves 1206, 1208 of the algorithm as described in relation to the flowchart 500 of FIG. 5 versus HM 15.0 for the RaceHorses sequence. From this graph 1200, we can see that both implementations have almost the same rate-distortion performance.

TABLE 2

Experimental results for recommended video sequences.

| Class | Video Sequences | ΔT (%) | BD-Rate (%) | BD-PSNR$_Y$ (dB) |
|---|---|---|---|---|
| A | Traffic | −35.4 | 0.95 | −0.051 |
|   | PeopleOnStreet | −34.1 | 1 | −0.057 |
|   | NebutaFestival | −34.1 | 0.53 | −0.039 |
|   | SteamLocomotiveTrain | −37.8 | 0.48 | −0.025 |
| B | Cactus | −36.1 | 1.34 | −0.05 |
|   | Kimono | −39.2 | 0.79 | −0.028 |
|   | ParkScene | −37.5 | 0.87 | −0.039 |
|   | BasketballDrive | −38.4 | 2.17 | −0.059 |
|   | BQTerrace | −35.2 | 0.79 | −0.048 |
| C | BQMall | −34.3 | 1.15 | −0.068 |
|   | PartyScene | −32.8 | 1.18 | −0.092 |
|   | RaceHorsesC | −34.7 | 0.72 | −0.047 |
|   | BasketballDrill | −33.1 | 0.8 | −0.039 |
| D | RaceHorses | −34.1 | 0.99 | −0.065 |
|   | BasketballPass | −36 | 1.45 | −0.085 |
|   | BlowingBubbles | −33.7 | 1.01 | −0.06 |
|   | BQSquare | −32.7 | 1.38 | −0.123 |
| E | Vidyo1 | −36.8 | 1.31 | −0.066 |
|   | Vidyo3 | −37.4 | 1.23 | −0.069 |
|   | Vidyo4 | −37.7 | 1.33 | −0.061 |
|   | Average | −35.6 | 1.07 | 0.059 |

Table 2 shows the results based on the Gap implementation. We have also implemented the method using the RDO distributions related to a specific range of SATD (Algorithm 2).

Table 3 shows the results of this implementation that are slightly better than the Gap implementation.

TABLE 3

Experimental results for recommended video sequences using RDO distributions.

| Video Sequences | ΔT(%) | BD-Rate(%) | BD-PSNR(dB) |
|---|---|---|---|
| RaceHorses_416x240_30 | −34 | 0.8 | −0.05 |
| BasketballPass_416x240_50 | −36 | 1.2 | −0.06 |
| BlowingBubbles_416x240_50 | −32 | 0.7 | −0.04 |
| BQSquare_416x240_60 | −32 | 1.2 | −0.08 |
| vidyo1_720p_60 | −39 | 1.2 | −0.05 |
| vidyo3_720p_60 | −39 | 1.1 | −0.05 |
| vidyo4_720p_60 | −39 | 1.1 | −0.04 |
| Traffic_2560x1600_30_crop | −37 | 0.8 | −0.04 |
| PeopleOnStreet_2560x1600_30_crop | −37 | 1.0 | −0.05 |
| Cactus_1920x1080_50 | −37 | 1.1 | −0.04 |
| Kimono1_1920x1080_24 | −41 | 0.7 | −0.02 |
| ParkScene_1920x1080_24 | −38 | 0.5 | −0.02 |
| BasketballDrive_1920x1080_50 | −40 | 1.8 | −0.05 |
| BQTerrace_1920x1080_60 | −37 | 0.6 | −0.03 |
| BQMall_832x480_60 | −36 | 0.9 | −0.04 |
| PartyScene_832x480_50 | −32 | 0.8 | −0.05 |
| RaceHorses_832x480_30 | −35 | 0.6 | −0.03 |
| BasketballDrill_832x480_50 | −35 | 0.5 | −0.02 |
| Average | −36 | 0.9 | −0.04 |

5. CONCLUSION

Embodiments of the present invention provide a fast intra mode decision methods and systems for the new video coding standard HEVC. These methods and systems provide improvements over conventional the edge detection methods by attributing three modes for each detected edge, and enhances the schemes that exploit the spatial correlation among neighboring blocks by introducing the concept of most relevant modes. Furthermore, binary classification and RDO dodging, are described, which significantly reduce the number of calculations for RDO process. Experimental results show that in comparison with the reference implementation of HEVC, HM 15.0, embodiments of the present invention achieve a 35.6% time reduction on average, with a very small penalty in coding efficiency (0.059 dB loss and 1.07% rate increment) if Gap idea is implemented. For the RDO distributions implementation the time reduction, PSNR loss and rate increment is 36%, 0.04 dB and 0.9% respectively.

Moreover, all steps of the method are based on parameters that can be adjusted based on the desired compromise between complexity reduction and coding efficiency. These make the proposed method attractive for various applications.

It should be noted at the onset that streams of telemetry data and data output from the systems and methods for analyzing the streams of telemetry data described below are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

The disclosed embodiments are illustrative, not restrictive. While specific configurations of the video encoding methods and systems have been described, it is understood that the present invention can be applied to a wide variety of video encoding technology. There are many alternative ways of implementing the invention.

What is claimed is:

1. A method for video coding, the method comprising:
    (i) selecting a first set of prediction modes;
    (ii) calculating an approximate cost of each of the first set of prediction modes;
    (iii) creating a second set of prediction modes including a prediction mode in the first set of prediction modes having a minimum approximate cost compared to other prediction modes in the first set of prediction modes;
    (iv) for each of other prediction modes in the first set of prediction modes:
        (a) calculating a probability P that one of the other prediction modes in the first set of prediction modes has higher Rate Distortion Optimization (RDO) cost than a mode having a minimum approximate cost; and
        (b) provided that the probability P is below a confidence level, adding the one of the other prediction modes in the first set of prediction modes to the second set of prediction modes, wherein the confidence level is in a range from about 0.2 to about 0.9;
    (v) calculating an RDO cost for each prediction mode in the second set of prediction modes; and
    (vi) selecting, from the second set of prediction modes, a prediction mode having a smallest RDO cost for the video coding, thereby reducing computational time for the video coding.

2. The method as claimed in claim 1 wherein the step (i) comprises selecting a Direct Current (DC) prediction mode.

3. The method as claimed in claim 1 wherein the step (i) comprises selecting a planar prediction mode.

4. The method as claimed in claim 1 wherein the step (i) comprises selecting Most Relevant Mode (MRM) prediction modes from neighboring blocks.

5. The method as claimed in claim 1 wherein the step (ii) comprises calculating the approximate costs using a Sum of Absolute Transformed Differences (SATD).

6. The method as claimed in claim 1 wherein the step (ii) comprises calculating the approximate costs using a Sum of Square Error (SSE).

7. The method as claimed in claim 1 wherein the step (ii) comprises calculating the approximate costs using a Sum of Absolute Difference (SAD).

8. The method as claimed in claim 1 wherein the step (a) comprises calculating a probability $P((W_i=X-Y_i)<0)$ where X is a normal probability distribution having a mean of $\mu_x$ and a variance of $\sigma_x^2$, $Y_i$ is a normal probability distribution having a mean of $\mu_y$ and a variance of $\sigma_y^2$ and $W_i$ is a normal probability distribution having a mean of $\mu_x-\mu_y$ and a variance of $\sigma_x^2+\sigma_y^2$.

9. The method of claim 1 wherein a type of the prediction modes is Intra prediction mode.

10. The method of claim 1 wherein a type of the prediction modes is Inter prediction mode.

11. The method as claimed in claim 1 wherein the step (a) comprises calculating a probability $P((W_i=X-Y_i)<0)$ where X is a Rician probability distribution, $Y_i$ is a Rician probability distribution and $W_i$ is a Rician probability distribution.

12. The method as claimed in claim 1 wherein the step (a) comprises calculating a probability $P((W_i=X-Y_i)<0)$ where X is a t-location scale probability distribution, $Y_i$ is a t-location scale probability distribution and $W_i$ is a t-location scale probability distribution.

13. The method as claimed in claim 1 wherein the step (a) comprises calculating a probability $P((W_i=X-Y_i)<0)$ where X is a generalized extreme value probability distribution, $Y_i$ is a generalized extreme value probability distribution and $W_i$ is a generalized extreme value probability distribution.

14. The method as claimed in claim 1 wherein the confidence level is from about 0.6 to about 0.7.

15. The method as claimed in claim 1 wherein the confidence level is from about 0.5 to about 0.8.

16. A system for video coding, comprising:
a non-transitory computer-readable storage medium having instructions stored thereon that, when executed, cause a processor to:
(i) select a first set of prediction modes;
(ii) calculate an approximate cost of each of the first set of prediction modes;
(iii) create a second set of prediction modes including a prediction mode in the first set of prediction modes having a minimum approximate cost compared to other prediction modes in the first set of prediction modes;
(iv) for each of other prediction modes in the first set of prediction modes:
  a) calculate a probability P that one of the other prediction modes in the first set of prediction modes has higher Rate Distortion Optimization (RDO) cost than a mode having a minimum approximate cost; and
  b) provided the probability P is below a confidence level, add the one of the other prediction modes in the first set of prediction modes to the second set of prediction modes, wherein the confidence level is in a range from about 0.2 to about 0.9;
(v) calculate an RDO cost for each prediction mode in the second set of prediction modes; and
(vi) from the second set of prediction modes, select a prediction mode for the video coding having a smallest RDO cost, thereby reducing computational time of the video coding.

17. The system as claimed in claim 16 wherein the instructions causing the processor to (i) select the first set of prediction modes further cause the processor to select a Direct Current (DC) prediction mode.

18. The system as claimed in claim 16 wherein the instructions causing the processor to (i) select the first set of prediction modes further cause the processor to select a planar prediction mode.

19. The system as claimed in claim 16 wherein the instructions causing the processor to (i) select the first set of prediction modes further cause the processor to select Most Relevant Modes (MRM) prediction modes from neighboring blocks.

20. The system as claimed in claim 16 wherein the instructions causing the processor to (ii) calculate the approximate cost of each of the first set of prediction modes further cause the processor to calculate the approximate costs using a Sum of Absolute Transformed Differences (SATD) algorithm.

21. The system as claimed in claim 16 wherein the instructions causing the processor to (ii) calculate the approximate cost of each of the first set of prediction modes further cause the processor to calculate the approximate costs using a Sum of Square Error (SSE) algorithm.

22. The system as claimed in claim 16 wherein the instructions causing the processor to (ii) calculate the approximate cost of each of the first set of prediction modes further cause the processor to calculate the approximate costs using a Sum of Absolute Difference (SAD) algorithm.

23. The system as claimed in claim 16 wherein the instructions causing the processor to a) calculate the probability P further cause the processor to calculate a probability $P((W_i=X-Y_i)<0)$ where X is a normal probability distribution having a mean of $\mu_x$ and a variance of $\sigma_x^2$, $Y_i$ is a normal probability distribution having a mean of $\mu_y$ and a variance of $\sigma_y^2$ and $W_i$ is a normal probability distribution having a mean of $\mu_x-\mu_y$ and a variance of $\sigma_x^2+\sigma_y^2$.

24. The system as claimed in claim 16 wherein a value of the confidence level is chosen to be in a range of about 0.6-0.7.

25. The system as claimed in claim 16 wherein a value of the confidence level is chosen to be in a range of about 0.5-0.8.

26. The system of claim 16 wherein a type of the prediction modes is Intra prediction mode.

27. The system of claim 16 wherein a type of the prediction modes is Inter prediction mode.

* * * * *